(12) United States Patent
Kuwa

(10) Patent No.: US 7,239,452 B2
(45) Date of Patent: Jul. 3, 2007

(54) PROJECTION OPTICAL SYSTEM

(75) Inventor: Tomiei Kuwa, Musashino (JP)

(73) Assignee: Konica Minolta Opto, Inc., Hachioji-Shi (JP)

( * ) Notice: Subject to any disclaimer, the term of this patent is extended or adjusted under 35 U.S.C. 154(b) by 0 days.

(21) Appl. No.: 11/101,344

(22) Filed: Apr. 7, 2005
(Under 37 CFR 1.47)

(65) Prior Publication Data
US 2006/0176579 A1 Aug. 10, 2006

(30) Foreign Application Priority Data
Apr. 14, 2004 (JP) ............... 2004-119501

(51) Int. Cl.
*G02B 9/00* (2006.01)
*G03B 21/22* (2006.01)
*G03B 21/28* (2006.01)

(52) U.S. Cl. ............... 359/649; 353/78; 353/99

(58) Field of Classification Search ........ 359/649–651, 359/726–731; 353/78, 99
See application file for complete search history.

(56) References Cited

U.S. PATENT DOCUMENTS 6,631,994 B2  10/2003  Suzuki et al. ............. 353/77
6,690,517 B2  2/2004  Ohzawa et al. ............ 359/649
2001/0048558 A1  12/2001  Lin ............................ 359/555

FOREIGN PATENT DOCUMENTS

| JP | 9-138349 A | 5/1997 |
|----|------------|--------|
| JP | 2001-215412 A | 8/2001 |
| JP | 2001-264627 A | 9/2001 |
| JP | 2002-174853 A | 6/2002 |
| JP | 2002-341452 A | 11/2002 |
| JP | 2003-35870 A | 2/2003 |

*Primary Examiner*—Ricky Mack
*Assistant Examiner*—William Choi
(74) *Attorney, Agent, or Firm*—Sidley Austin LLP

(57) ABSTRACT

A projection optical system for performing enlargement projection from a primary image surface on the reduction side to a secondary image surface on the enlargement side has, from the primary image surface side, a lens optical system including two or more lens elements sharing a common rotation-symmetry axis and each having an optical power, a first reflective optical element having an optical power, and a second reflective optical element having a negative optical power. The projection optical system is non-telecentric toward the reduction side, and a prescribed condition is.

22 Claims, 24 Drawing Sheets

PROJECTION OPTICAL SYSTEM

This application is based on Japanese Patent Application No. 2004-119501 filed on Apr. 14, 2004, the contents of which are hereby incorporated by reference.

BACKGROUND OF THE INVENTION

1. Field of the Invention

The present invention relates to a projection optical system, and more particularly to a projection optical system that incorporates reflective and refractive optical elements in an optical construction suitable for rear projection.

2. Description of Related Art

In a projection optical system for performing wide-angle enlargement projection from a primary image surface on the reduction side to a secondary image surface on the enlargement side, disposing in the optical path a negative mirror closer to the secondary image surface is effective in reducing chromatic aberration and distortion. Projection optical systems including a negative mirror for reducing chromatic and other aberrations are proposed, for example, in Patent Publications 1 to 3 listed below. Patent Publication 1 proposes a projection optical system in which there are arranged, from the primary image surface side, a refractive lens group, a flat mirror, a negative mirror, and a flat mirror. This construction helps realize a wide-angle, high-performance projection optical system and a slim projection apparatus. Moreover, here, for enhanced optical performance, reflective surfaces are formed as non-rotation-symmetric free-form, anamorphic aspherical, rotation-symmetric aspherical, or other surfaces.

According to Patent Publication 2, there are arranged, from the primary image surface side, a refractive lens group (whose optical axis is perpendicular to the normal vector to the secondary image surface), a flat mirror, a negative mirror, and a flat mirror. This construction helps realize a wide-angle, high-performance projection optical system and a slim projection apparatus. Moreover, the refractive lens group is so designed that, in the part thereof located on the enlargement side of the aperture stop provided therein, the radius of the circle that encircles all the image light rays as observed at each surface provided in that part of the refractive lens group first increases and the decreases. This helps lessen the large positive Petzval sum produced by the negative mirror and thereby achieve still higher performance. Moreover, for enhanced optical performance, the reflective surface of the negative mirror is formed as a non-rotation-symmetric free-form surface.

According to Patent Publication 3, there are arranged, from the primary image surface side, a refractive lens group (whose optical axis is perpendicular to the normal vector to the secondary image surface), a fourth mirror having a flat reflective surface, a third mirror having a negative or positive optical power, a second mirror having a negative or positive optical power or a flat reflective surface, and a first mirror having a flat reflective surface. This helps realize a slim projection apparatus. Using two curved-surface mirrors helps reduce the Petzval sum, permitting the eccentric aberration produced by each mirror to be compensated for by the other. Moreover, the eccentric aberration produced by the third mirror is corrected for by an eccentricity correction lens element provided in the refractive lens group, and, for enhanced optical performance, the reflective surfaces of the negative and positive mirrors are formed as aspherical or free-form surfaces.

Patent Publication 1: Japanese Patent Application Laid-Open No. 2001-264627
Patent Publication 2: U.S. Pat. No. 6,690,517
Patent Publication 3: Japanese Patent Application Laid-Open No. 2002-341452

The projection optical systems proposed in Patent Publications 1 and 2 achieve a wide angle by the use of reflective and refractive optical elements. Here, if the absolute value of the optical power of the negative mirror can be increased, it is possible to achieve a wider angle. However, increasing the absolute value of the optical power of the negative mirror causes the Petzval sum to become lopsided in the positive direction. Thus, to secure satisfactory image surface flatness, the Petzval sum needs to be shifted back in the negative direction, and this requires that, somewhere within the entire optical system, the absolute value of the optical power of a refractive lens element having a negative optical power be increased. This, however, cannot be done without lengthening the focal length of the refractive lens group, and thus brings an effect contrary to a wider angle. Moreover, in a telecentric system, it is essential to dispose in the optical path a lens element having a strong positive optical power (causing the Petzval sum to be shifted in the positive direction) on the primary image surface side of the refractive lens group, and this makes it difficult to achieve a wider angle.

Another way to achieve a wider angle is to use larger reflective optical elements and adopt a construction that permits distortion to be reduced more easily. In this construction, however, the light beam needs to be made to diverge by the refractive lens group located on the primary image surface side of the reflective optical elements. This requires that the interval between the refractive lens group and the reflective optical elements be increased, or that the effective diameter of the refractive lens group be increased, or that the number of lens elements provided in the refractive lens group be increased. Doing any of these eventually makes the projection apparatus larger and increases costs.

Moreover, when use as a rear projection apparatus is considered, to make the apparatus as a whole slim, the optical path needs to be bent with a flat mirror or the like disposed between the refractive lens group and the reflective optical elements (see paragraph 0019 of Patent Publication 1). However, as described above, the use of larger reflective optical elements and of a wider-angle refractive lens group makes it extremely difficult to lay out the optical path inside the rear projection apparatus, and thus makes it impossible to achieve a wider angle. Moreover, to dispose a flat mirror without interference with other optical elements or the optical path, it is necessary to secure a large space between the refractive lens group and the negative mirror. This increases the optical path length through the projection optical system, and is thus unsuitable for aiming at a wider angle or making the projection apparatus slim.

The projection optical systems proposed in Patent Publications 1 and 2 reduce aberrations by giving the optical surface of the negative mirror a non-rotation-symmetric shape. Such a shape, however, cannot be produced by turning, and its production and evaluation require sophisticated technologies as compared with a rotation-symmetric shape. This may lead to higher costs.

With the projection optical system proposed in Patent Publication 3, a wider angle and further slimness are possible thanks to the second and third mirrors having optical powers and the eccentricity correction lens element. The Petzval sum, if shifted in the positive direction by a negative mirror, can be shifted back in the negative direction with a positive mirror, but those are not achieved because of the other part of the construction and the inevitable restrictions. The first reason relates to, as in the projection optical systems disclosed in Patent Publications 1 and 2, the presence of a flat mirror as the fourth mirror. An attempt to bend the optical path with the fourth mirror without interference ends in securing a large space between the refractive optical system and the third mirror. This makes the optical path length greater and requires larger optical elements, and is thus unsuitable for aiming at a wider angle and further compactness. The second reason relates to the inclination of the first mirror with respect to the screen. This relates to the small launch angle θ (see FIG. 2 of Patent Publication 3). That is, the difference in optical path length between, of the principal rays traveling from the third mirror to the screen, those reaching the top end of the screen and those reaching the bottom end thereof (the ±Y-direction ends in FIG. 2 of Patent Publication 3) is small. Thus, this construction hardly differs from a coaxial optical system whose optical path is bent a plurality of times simply with flat reflective surfaces, and is thus unsuitable for aiming at a wider angle and further slimness. Moreover, the inclination of the first mirror with respect to the screen shortens the optical path length at the top end of the screen, making the construction unsuitable for aiming at a wider angle by increasing the degree of eccentricity or of shifting.

Moreover, the projection optical system proposed in Patent Publication 3 adopts an optical construction in which the display device and the second and third mirrors are three-dimensionally, rotationally eccentric. Thus, all the rays reaching the screen have no plane of symmetry at all. This makes it difficult to correct for aberrations, and is thus unsuitable for aiming at higher performance. Moreover, as increasingly wider angles are aimed at, the magnification of the projection optical system increases, and the second and third mirrors become larger as measured on the YZ plane (see FIG. 2 of the Patent Publication 3), making them difficult to produce and increasing costs. Thus, this construction is unsuitable for aiming at a wider angle, further slimness, and lower cost.

SUMMARY OF THE INVENTION

In view of the conventionally experienced inconveniences discussed above, it is an object of the present invention to provide a projection optical system that offers good optical performance, that is advantageous in terms of mass production and costs, that is slim and offers a large screen, and that is composed of lightweight and compact optical components.

To achieve the above object, in one aspect of the present invention, a projection optical system for performing enlargement projection from a primary image surface on the reduction side to a secondary image surface on the enlargement side is provided with, from the primary image surface side: a lens optical system including two or more lens elements sharing a common rotation-symmetry axis and each having an optical power; a first reflective optical element having an optical power; and a second reflective optical element having a negative optical power. Here, the projection optical system is non-telecentric toward the reduction side, and the following condition is fulfilled:

$$30° \leq \theta \leq 70°$$

where

θ represents the angle of incidence at which the central principal ray is incident on the secondary image surface.

In another aspect of the present invention, a projection optical system for performing enlargement projection from a primary image surface on the reduction side to a secondary image surface on the enlargement side is provided with, from the primary image surface side: a rotation-symmetric lens optical system having a plurality of lens elements sharing a common lens optical axis; a free-form curved surface lens element having a non-rotation-symmetric aspherical surface; a first reflective optical element having an optical power; and a second reflective optical element having a negative optical power. Here, the projection optical system is non-telecentric toward the reduction side.

In another aspect of the present invention, a projection optical system for performing enlargement projection from a primary image surface on the reduction side to a secondary image surface on the enlargement side is provided with, from the primary image surface side: a rotation-symmetric lens optical system having a plurality of lens elements sharing a common lens optical axis, the rotation-symmetric lens optical system being disposed, among all the optically powered optical elements provided in the projection optical system, closest to the primary image surface; a free-form curved surface lens element having a non-rotation-symmetric aspherical surface; a first reflective optical element having an optical power; and a second reflective optical element having a negative optical power.

In another aspect of the present invention, a projection optical system for performing enlargement projection from a primary image surface on the reduction side to a secondary image surface on the enlargement side is provided with, from the primary image surface side: a lens optical system including two or more lens elements sharing a common rotation symmetry axis and each having an optical power; a first reflective optical element having an optical power; a second reflective optical element having a negative optical power, and a flat reflection mirror disposed parallel to the secondary image surface so as to bend an optical path. Here, the projection optical system is non-telecentric toward the reduction side, and the following condition is fulfilled:

$$30° \leq \theta \leq 70°$$

where

θ represents the angle of incidence at which the central principal ray is incident on the secondary image surface.

According to the present invention, with a unique construction provided with a refractive lens group combined with a first and a second reflective optical elements having a positive and a negative optical power respectively, it is possible to realize a projection optical system that offers good optical performance, that is advantageous in terms of mass production and costs, that is slim and offers a large screen, and that is composed of lightweight and compact optical components.

DETAILED DESCRIPTION OF PREFERRED EMBODIMENTS

Figure 1:
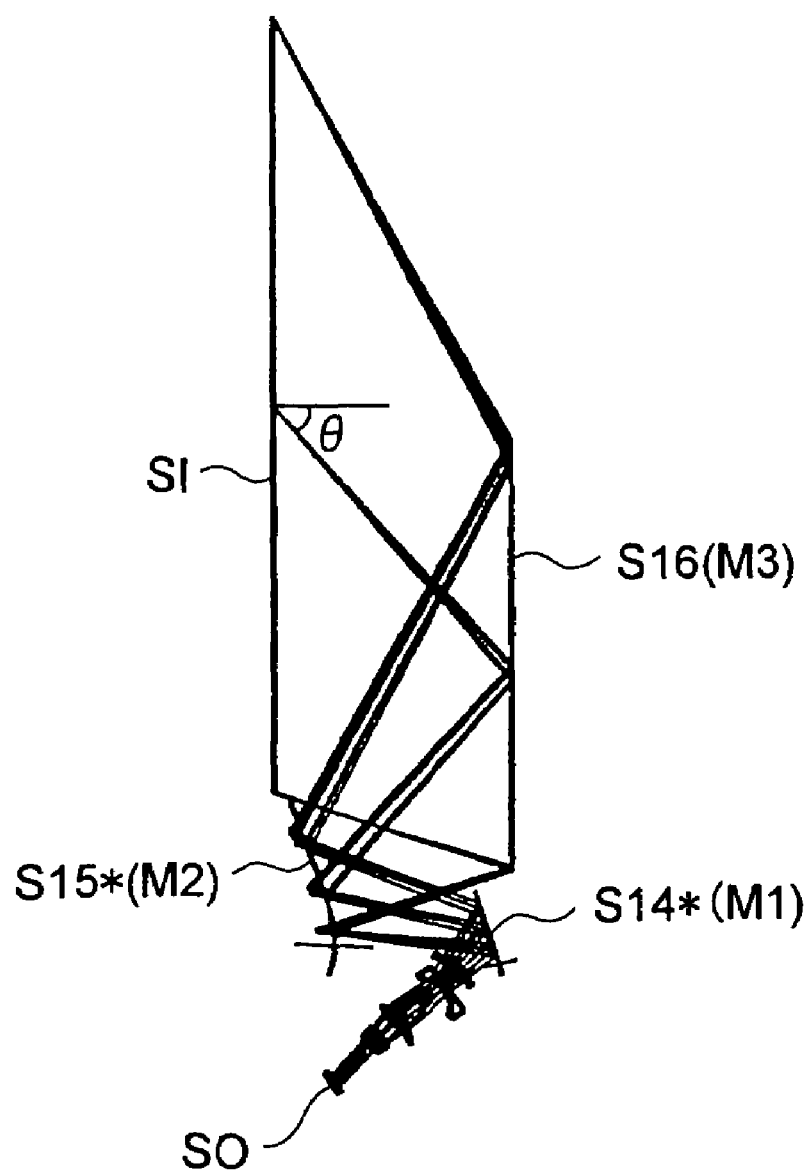
FIG. 1 is a sectional view showing the optical construction of a first embodiment (Example 1) of the invention.
Figure 2:
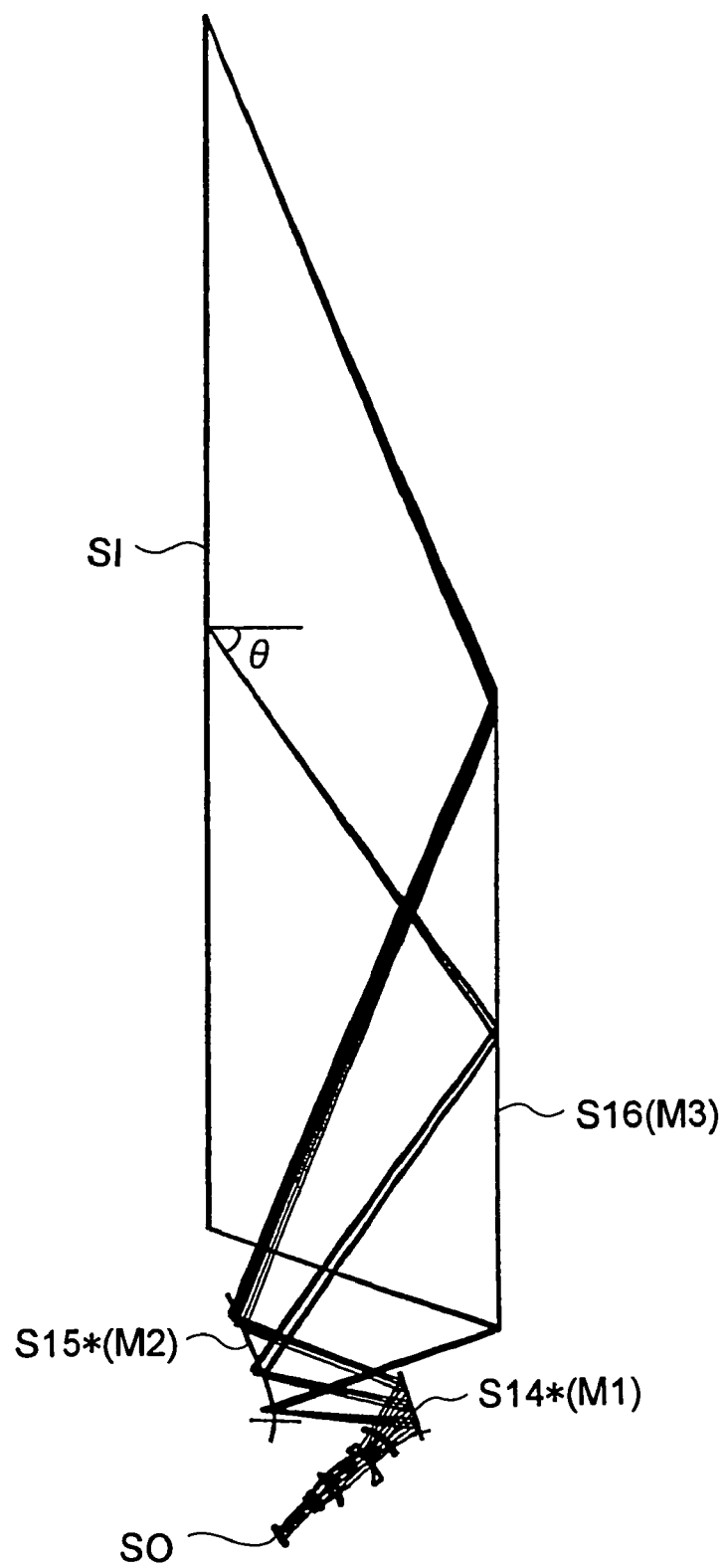
FIG. 2 is a sectional view showing the optical construction of a second embodiment (Example 2) of the invention.
Figure 3:
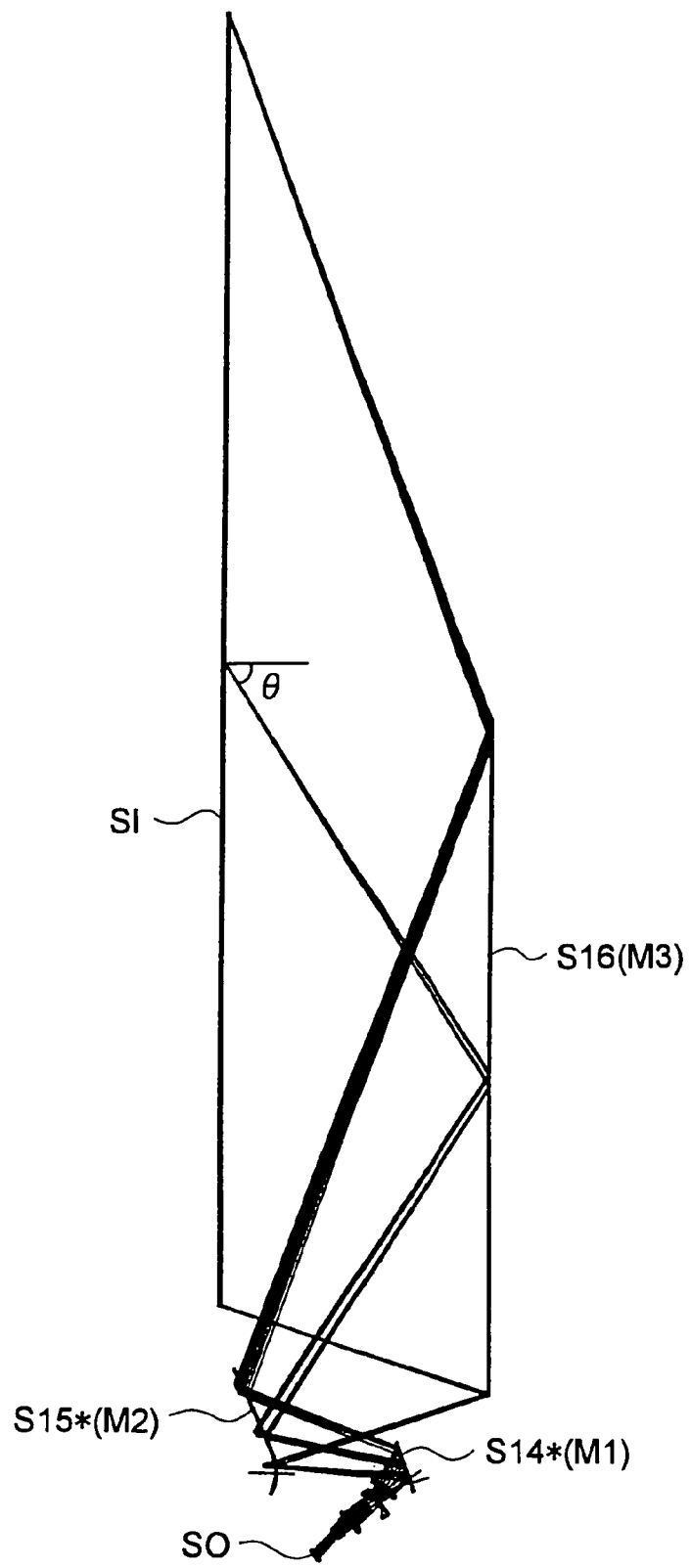
FIG. 3 is a sectional view showing the optical construction of a third embodiment (Example 3) of the invention.
Figure 4:
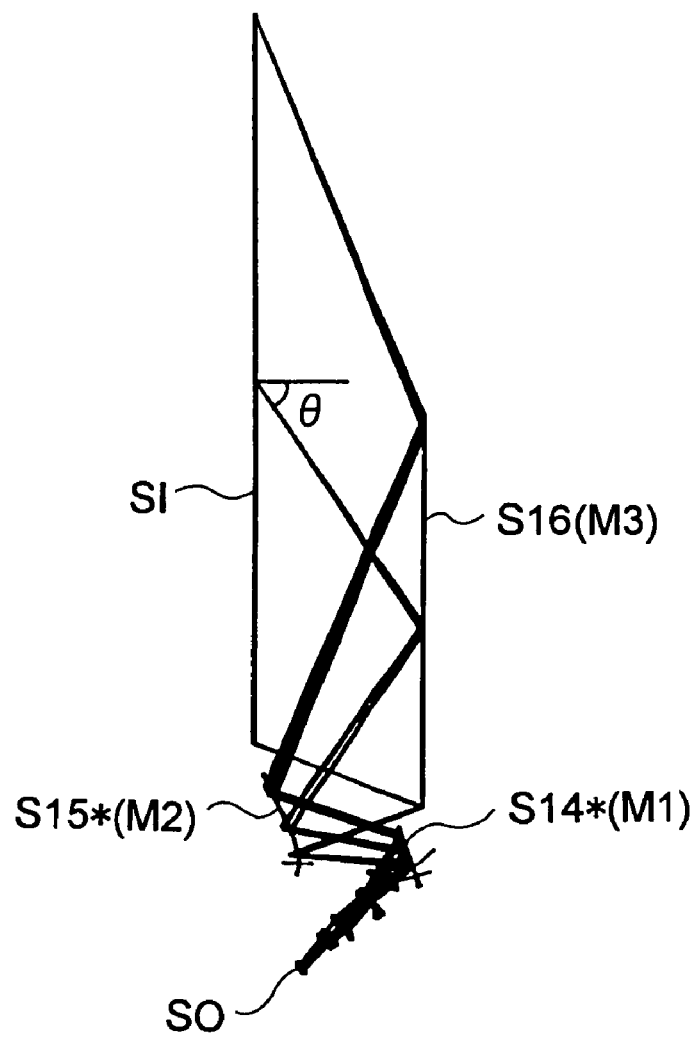
FIG. 4 is a sectional view showing the optical construction of a fourth embodiment (Example 4) of the invention.
Figure 5:
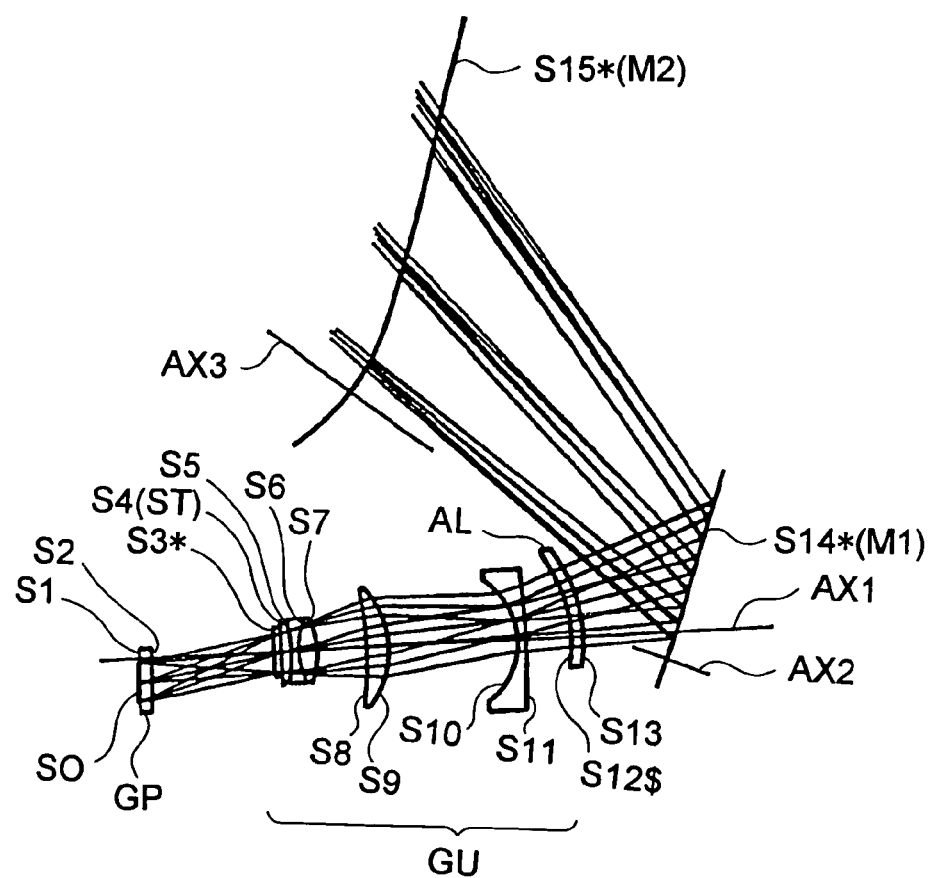
FIG. 5 is an enlarged view of a principal portion of FIG. 1.
Figure 6:
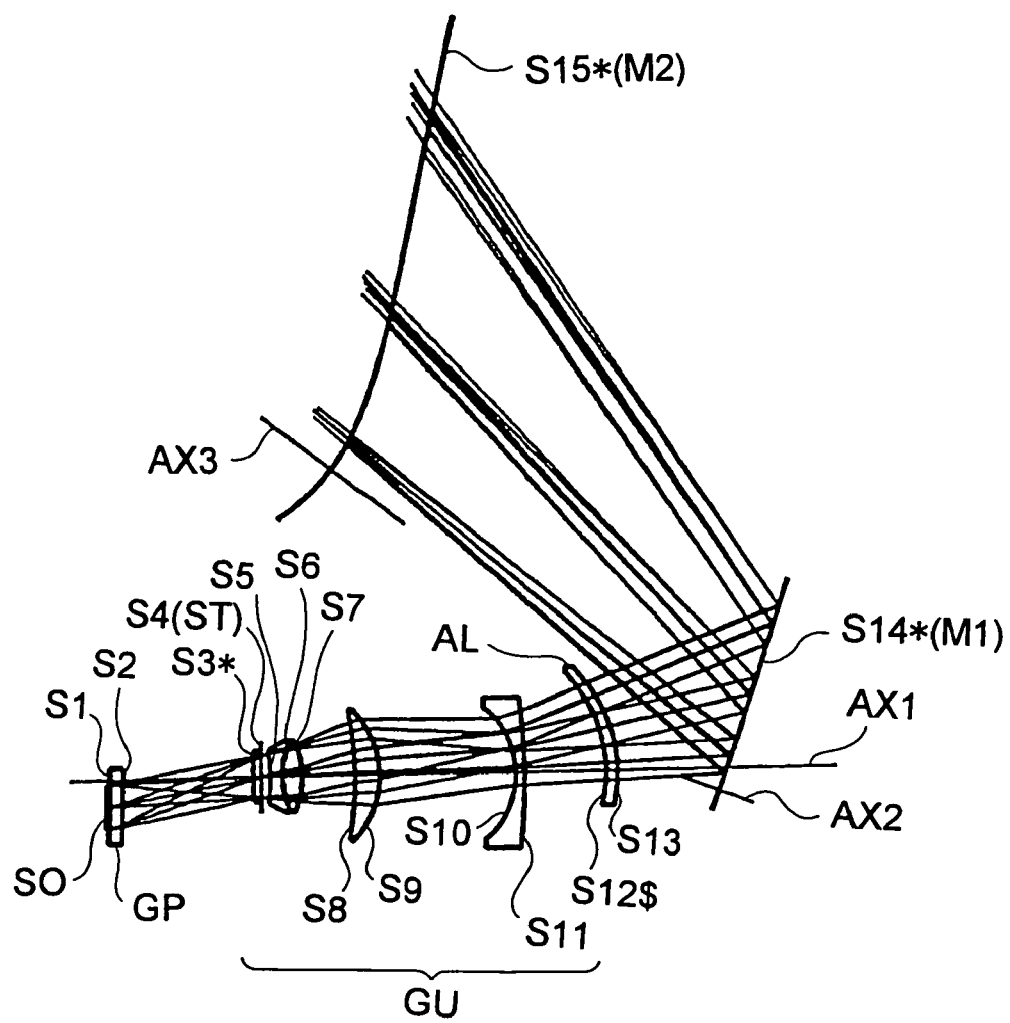
FIG. 6 is an enlarged view of a principal portion of FIG. 2.
Figure 7:
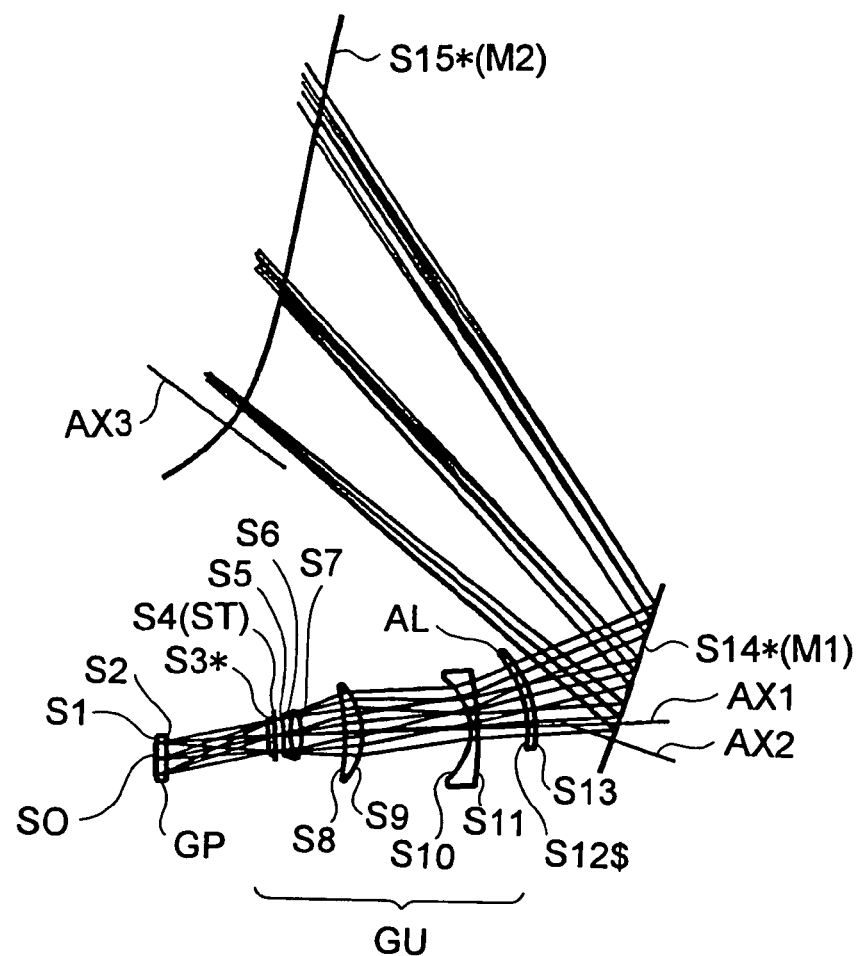
FIG. 7 is an enlarged view of a principal portion of FIG. 3.
Figure 8:
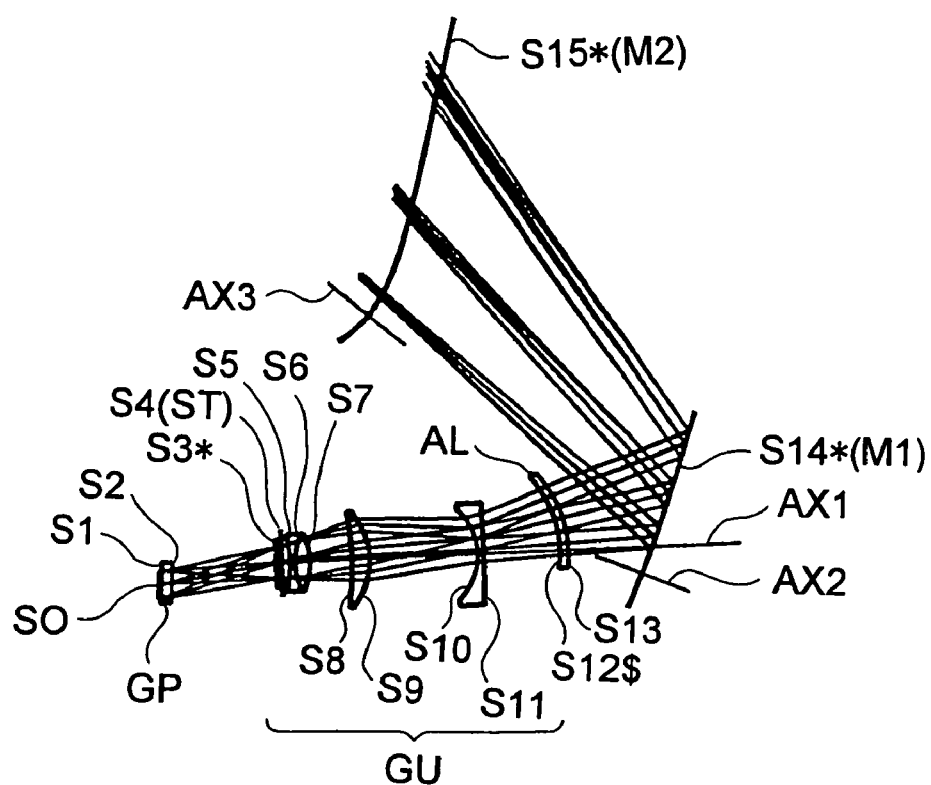
FIG. 8 is an enlarged view of a principal portion of FIG. 4.

Hereinafter, projection optical systems embodying the present invention will be described with reference to the drawings. FIGS. 1 to 4 show the optical construction (optical arrangement, projection optical path, etc.) of the entire projection optical path from the primary image surface SO to the secondary image surface SI in the projection optical systems of a first to a fourth embodiment, respectively, of the invention, as viewed in an optical section (namely the XY section, as will be described later) taken in the direction of the longer sides of the image provided on the primary image surface SO. FIGS. 5 to 8 are each an enlarged view of a principal portion of FIGS. 1 to 4, respectively. In any of the embodiments, the optical construction may be turned upside down as compared with those shown in FIGS. 1 to 8; that is, the top and bottom ends of the optical construction shown in FIGS. 1 to 8 may be inverted to suite the actual apparatus arrangement, optical arrangement, etc. In FIGS. 1 to 8, an optical surface marked with an asterisk (*) is a rotation-symmetric aspherical surface, and an optical surface marked with a dollar sign ($) is a non-rotation-symmetric aspherical surface (i.e., so-called free-form surface).

The first to fourth embodiments all deal with oblique projection optical systems, for use in image projection apparatuses, that perform enlargement projection in an oblique direction from the primary image surface SO on the reduction side to the secondary image surface SI on the enlargement side. Thus, the primary image surface SO corresponds to the image formation surface (for example, the image display surface) of a light valve that forms a two-dimensional image by modulating light intensity, and the secondary image surface SI corresponds to the projected image surface (for example, the screen surface). Located near the primary image surface SO is a glass plate GP (FIGS. 5 to 8), which is the cover glass of the light valve. In the embodiments, the light valve is assumed to be realized with a digital micromirror device. The light valve, however, may be realized with any other type of non-luminous, reflective (or transmissive) display device (for example, a liquid crystal display device) that suits the oblique projection optical system of each embodiment. When the light valve is realized with a digital micromirror device, the light incident thereon has its intensity spatially modulated by being reflected by individual micromirrors that are each in an ON or OFF state (inclined at either, for example, ±12°) at a time. Here, only the light reflected by the micromirrors in the ON state enters the oblique projection optical system so as to be projected onto the screen surface. Instead of the light valve mentioned above, a luminous display device may be used. Using a luminous display device as an image display device eliminates the need for a light source for illumination and components associated therewith. Thus, this helps realize a more lightweight and compact optical construction.

In all the embodiments, the oblique projection optical system has an optical construction suitable for use in a rear-projection image projection apparatus (rear projector), but can also be used, as an oblique projection optical system that performs reduction projection in an oblique direction from the secondary image surface SI to the primary image surface SO, in an image reading apparatus. In this case, the primary image surface SO corresponds to the light-receiving surface of a light-receiving device (for example, a CCD, i.e., charge-coupled device) for image reading, and the secondary image surface SI corresponds to the image-to-be-read surface (i.e., the document surface). Moreover, in all the embodiments, since the reflective surface that the light beam passes immediately before it reaches the secondary image surface SI on the enlargement side is a flat reflective surface, when the third mirror M3 providing that flat reflective surface is removed and instead a screen is placed at the resulting new position of the secondary image surface SI, the oblique projection optical system can be used also in a front-projection image projection apparatus (front projector). With this construction, the oblique projection optical system can be used also as a reduction optical system.

In all the embodiments, the oblique projection optical system is provided with, from the primary image surface SO side: a refractive lens group GU (of which the optical axis is represented by AX1) built as a coaxial system with two or more refractive lens elements each having an optical power; a first mirror M1 (of which the rotation symmetry axis of the shape of the reflective surface is represented by AX2) having a positive optical power; a second mirror M2 (of which the rotation symmetry axis of the shape of the reflective surface is represented by AX3) having a negative optical power; and a third mirror M3 having a flat reflective surface. The light rays emanating from the primary image surface SO first pass the glass plate GP covering the primary image surface SO. The surfaces S1 and S2 of this glass plate GP are both non-power optical surfaces, and are not included in the refractive lens group GU.

Having passed through the glass plate GP, the light rays then passes through the refractive lens group GU, which includes surfaces S3 to S13. In this refractive lens group GU, the surface S3 is a rotation-symmetric aspherical surface, and the surface S12 is a non-rotation-symmetric extended aspherical surface. An aperture stop ST is provided on the surface S4, and the surfaces S5 to S7 form a cemented lens group. Except for the surface S12, the refractive lens group GU forms a coaxial system, but the optical axis AX1 of the refractive lens group GU is not parallel to a normal to the primary image surface SO. This construction alleviates the interference that occurs when the optical path is bent, and helps obtain good image surface flatness. Having exited from the refractive lens group GU, the light rays are then reflected from the reflective surface S14 of the first mirror M1 formed as a rotation-symmetric aspherical surface, are then reflected from the reflective surface S15 of the second mirror M2 formed as a rotation-symmetric aspherical surface, are then reflected from the reflective surface S16 of the third mirror M3 formed as a flat reflective surface, and then reach the secondary image surface SI.

In a projection optical system, like those of the embodiments, that performs enlargement projection from a primary image surface on the reduction side to a secondary image surface on the enlargement side, it is preferable that there be provided, from the primary image surface side: a refractive lens group including two or more refractive lens elements sharing a common rotation symmetry axis and each having an optical power; a first reflective optical element; and a second reflective optical element having a negative optical power. Using a reflective surface having a negative optical power makes it possible to reduce lateral chromatic aberration, and thus makes it easy to correct distortion. However, a negative-powered mirror exerting such an effect is typically large and difficult to produce, and thus using it increases costs and make the apparatus larger. On the other hand, increasing the negative optical power with a view to obtaining a wider angle or a smaller size shifts the Petzval sum in the positive direction, and this makes it difficult to obtain good image surface flatness. To correct for this, it is preferable that the first reflective optical element be given a positive optical power. That is, giving the first and second reflective optical elements a positive and a negative optical power, respectively, serves effectively to obtain satisfactory optical performance while simultaneously achieving compactness and a wide angle. In all the embodiments, this construction is realized with the first mirror M1 having a positive optical power and the second mirror M2 having a negative optical power. Thus, with the construction described above, it is possible to realize a projection optical system that offers good optical performance, that is advantageous in terms of mass production and costs, that is slim and offers a large screen, and that is composed of lightweight and compact optical components.

In all the embodiment, the third mirror M3 is realized with a flat mirror, and is disposed so that a normal to the reflective surface of the third mirror M3 is parallel to a normal to the secondary image surface SI. In a projection optical system including a reflective optical element, it is necessary to aim at a wider angle while avoiding interference with the optical path, and thus an increase in the degree of eccentricity or of shifting that accompanies the realization of a wider angle is equivalent to an increases in the maximum optical path length difference among all the projected light rays. When the thickness of the apparatus is aligned with a normal to the secondary image surface, disposing a reflective surface (corresponding to a so-called rear-side mirror) between the projection optical system and the secondary image surface makes it possible, by bending the optical path, to reduce the thickness of the apparatus. Using a curved surface as this reflective surface is very effective in correcting distortion, and is therefore preferable for securing good optical performance. However, since the rear-side mirror is very large as compared with other optical elements, it is preferable that a flat surface be used as the reflective surface thereof. That is, it is preferable that the reflective optical element that faces the secondary image surface be given a flat reflective surface that is easy to produce and contributes to lower costs. Moreover, to maintain a large maximum optical path length difference while keeping the apparatus slim, it is preferable that a normal to the reflective surface of the rear-side mirror be parallel or substantially parallel to a normal to the secondary image surface.

As described above, reducing the size of the second reflective optical element having a negative optical power helps reduce the cost thereof, and disposing the first reflective optical element having a positive optical power to face the second reflective optical element helps obtain good image surface flatness while avoiding interference with the optical path. For a proper balance among the costs, apparatus thickness, angle of view, optical performance, etc., it is preferable that conditional formula (1) below be fulfilled.

$$0<(RV/V1)\times(T/V2)<5 \qquad (1)$$

where

RV represents the dimension of the effective optical path on the second reflective optical element as measured in the direction of the shorter sides of the secondary image surface (>0, in mm);

V1 represents the dimension of the primary image surface in the direction of the shorter sides thereof (>0, in mm);

T represents the thickness of the apparatus in the direction of a normal to the secondary image surface (>0, in mm); and V2 represents the dimension of the secondary image surface in the direction of the shorter sides thereof (>0, in mm).

The term (RV/V1) in conditional formula (1) represents the ratio of the size of the second reflective optical element to the size of the primary image surface. The greater this value, the larger the size of the second reflective optical element, and thus the higher the cost of the apparatus. On the other hand, the term (T/V2) represents not the absolute value of the apparatus thickness but the apparatus thickness expressed as a ratio (specifically, the ratio of the thickness of the apparatus to the size of the secondary image surface). The greater this value, the less slim the apparatus. Thus, if the upper limit of conditional formula (1) is disregarded, either the apparatus is slim but the second reflective optical element has a large reflective surface, or the second reflective optical element has a small reflective surface but the apparatus is thick, or the apparatus is thick and in addition the second reflective optical element has a large reflective surface.

It is further preferable that conditional formula (1a) below be fulfilled.

$$3<(RV/V1)\times(T/V2)<4.5 \tag{1a}$$

If the upper limit of conditional formula (1a) is disregarded, for the reasons stated above, it becomes more difficult to achieve slimness and lower costs. On the other hand, if the lower limit of conditional formula (1a) is disregarded, the following problems tends to arise. If the size of the second reflective optical element having a negative optical power is too small, the second reflective optical element produces too great a positive Petzval value, resulting in poor image surface flatness and thus making it difficult to maintain good optical performance. If the apparatus is too slim, it is difficult to lay out the light beam between the first and second reflective optical elements without interference with the light beams before entering and after leaving them.

In general, with a view to avoiding interference between the light beam and structural components that may occur when a wider angle is aimed at, a projection optical system including a reflective optical element is required to be either a shifted system, i.e., a system in which a portion thereof is lopsided with respect to the rotation symmetry axis reference of the entire system, or a non-axial system, i.e., a system in which the rotation symmetry axis of the entire system is bent so that the system has no rotation symmetric axis reference. By increasing the degree of shifting or of eccentricity, it is possible to achieve a wider angle, but, to efficiently avoid interference between the light beam and structural components, it is preferable that at least one of the first and second reflective optical elements have an optical power eccentric with respect to a normal to the primary image surface.

It is preferable that the refractive lens group GU be shifted in the direction of the shorter sides of the primary image surface SO (the image formation surface of the light valve), and it is preferable that the distance from the intersection at which the optical axis AX1 of the refractive lens group GU intersects the primary image surface SO to the center of the image formation surface be 30% or more of the length of the shorter sides of the image formation surface. This makes it easy to separate optical paths, and thus helps effectively make the apparatus slim. For example, in a case where the light valve is realized with a digital micromirror device, it is easy to separate illumination light and projection light.

In any of the embodiments, the first and second reflective optical elements (namely the first and second mirrors M1 and M2) that provide the positively or negatively powered reflective surfaces are produced by applying a reflective coating (a metal thin film or the like) to optical components produced by injection molding, pressing, cutting, or the like. These optical components are made of plastic (such as ultraviolet-curing resin), glass, metal, or the like. The reflective optical elements may be realized with reflective holograms, reflective diffractive optical elements, reflective Fresnel elements, or the like.

It is preferable that the projection optical system have an aperture stop and that a lens element having a positive optical power and a lens element having a negative optical power be disposed adjacent to each other near the aperture stop in the optical path. This makes it possible to correct longitudinal chromatic aberration. Moreover, cementing together the lens element having a positive optical power and the lens element having a negative optical power eliminates the air gap between the positive and negative lens elements, and thus makes it possible to lower the sensitivity of those two lens elements to eccentric errors. In addition, by giving those lens elements appropriate refractive indices, it is possible to adjust the Petzval sum. Moreover, disposing a cemented lens element near the aperture stop is effective in simplifying the structure of the lens barrel. Moreover, arranging in the optical path, from the primary image surface side, an aperture stop, a lens element having a negative optical power, and a lens element having a positive optical power in this order eliminates the need to unnecessarily bend the light beam, and thus helps lower the sensitivity to eccentric errors. Out of these considerations, in all the embodiments, an aperture stop ST is provided on the surface S4, and the surfaces S5 to S7 form a cemented negative-positive lens group.

In all the embodiments, a reflective optical element having no optical power is used only as the third mirror M3, i.e., the rear-side mirror. It is preferable that, in this way, no reflective optical element having no optical power (i.e., bending mirror) be disposed between the most secondary-image-surface-side optical surface having an optical power (corresponding to the second mirror M2 in the embodiments) along the optical path and the primary image surface. A reflective optical element like a bending mirror is provided solely to avoid interference between the optical path of the projection light and structural components or to make the layout of the projection optical system physically possible, and is thus unnecessary in optical terms. Moreover, an attempt to avoid interference between the optical path relevant to the bending mirror and structural components places an extra optical burden on an optical element having an optical power (for example, requiring the optical path length to be extended), resulting in higher costs. Furthermore, a bending mirror inevitably produces eccentric errors and surface shape errors and has a reflectivity less than 100%, and thus its use leads to lower optical aberration performance and lower brightness. Thus, it is preferable that no reflective optical element having no optical power be disposed between the most secondary-image-surface-side optical surface having an optical power along the optical path and the primary image surface, in particular between reflective surfaces having optical powers or between reflective and refractive surfaces having optical powers.

Let the ray that passes through the center of the image on the primary image surface and through the center of the aperture stop be called the "central principal ray", let the plane that includes the incidence and emergence vectors of the central principal ray with respect to the first reflective optical element having an positive optical power (corresponding to the first mirror M1) be PL1, and let the incident light and emergent light of the central principal ray with respect to the second reflective optical element having a negative optical power (corresponding to the second mirror M2) be M2PRi and M2PRf, respectively. Then, it is preferable that both the incident light M2PRi and the emergent light M2PRf be included in the plane PL1. Moreover, it is preferable that the lens optical axis (AX1) of the refractive lens group be included in the plane PL1. Furthermore, it is preferable that the absolute value $|\theta 1|$ of the angle $\theta 1$ between a normal to the primary image surface SO and the optical axis AX1 of the refractive lens group GU be in the range from 0.5° to 10°. If the lower limit of this condition is disregarded, eccentric aberration is corrected for insufficiently, making it difficult to achieve a wider angle. On the other hand, if the upper limit is disregarded, the optical axis AX1 becomes so eccentric as to make it difficult to correct for aberrations. In particular, setting $|\theta 1|$ in the range from 0.5° to 5° helps achieve a proper balance between optical performance and wideness of angle. Incidentally, in Examples 1 to 4 presented later, the value of |θ1| is 2.5°, 1.7°, 2.1°, and 3.2°, respectively. A projection optical system that fulfills these conditions is either a coaxial system or an optical system eccentric in one direction; a projection optical system that does not fulfill those conditions is either an optical system including an optically unnecessary reflective optical element in the projection optical path as described above or an optical system eccentric in two or more directions. Accordingly, an optical system that does not fulfill the above conditions produces more complicated eccentric errors, and, to correct these, it is necessary to use an optical element having a complicated shape having no plane of symmetry or an optical element eccentric in two or more directions. This makes it difficult to achieve a wide angle, high performance, and lower costs. In practical terms, with consideration given to errors inevitable in production which cause the incident light M2PRi, the emergent light M2PRf, and the optical axis AX1 to deviate from the plane PL1, it is preferable that the absolute value of the angle between each of them and the plane PL1 be within 1°. In all the embodiments, the above conditions are fulfilled, and thus a wide angle, high performance, and lower costs are achieved.

It is preferable that the "central principal ray" from the center of the image on the primary image surface be obliquely incident on the secondary image surface, and in addition that the conditional formula below be fulfilled.

$$30° \leq \theta \leq 70°$$

where

θ represents the angle of incidence of the central principal ray with respect to the secondary image surface.

If the upper limit of the above conditional formula is disregarded, it is difficult to correct the trapezoid distortion resulting from oblique projection. If the lower limit of the above conditional formula is disregarded, oblique projection does not contributes to satisfactory slimness. Moreover, in the optical section (i.e., the XY section described later) shown in FIGS. 1 to 8, it is preferable that the rays that reach the bottom end of the secondary image surface SI form, rather than an optical path parallel to a normal to the primary image surface SO, an optical path inclined obliquely upward from the third mirror M3, i.e., the rear-side mirror, toward the secondary image surface SI. With a degree of shifting sufficient to permit all the rays from the primary image surface to be obliquely incident on the secondary image surface, it is possible to effectively slim down the apparatus. Incidentally, in Examples 1 to 4 presented later, the value of θ is 51.2°, 55.3°, 58.7°, and 56.20°, respectively. Moreover, in Examples 1 to 4 presented later, the maximum value of the angle of incidence of the principal rays with respect to the secondary image surface SI is 66.2°, 69.8°, 72.5°, and 70.0°, and the minimum value of the same angle of incidence is 23.2°, 19.7°, 19.6°, and 21.3°, respectively. Here, the angle of incidence θ corresponds to the center of the image on the secondary image surface SI, the maximum value correspond to the upper diagonal corners of the image on the secondary image surface SI, and the minimum value correspond to the middle of the bottom end of the image on the secondary image surface SI.

As will be understood from FIGS. 1 to 4, in all the embodiments, the relationship between the inclination of the primary image surface SO and that of the secondary image surface SI is so set as to be suitable for obtaining good optical performance. That is, in a projection optical system including a reflective optical element, to alleviate eccentric aberration resulting from an increase in the degree of eccentricity or of shifting that accompanies the pursuit of a wider angle, it is preferable that a normal to the primary image surface be inclined relative to a normal to the secondary image surface. Specifically, it is preferable that the absolute value |θ2| of the angle θ2 between a normal to the primary image surface and a normal to the secondary image surface be in the range from 15° to 60°. If the lower limit of this condition is disregarded, it is impossible to secure a sufficient degree of eccentricity, and thus makes it difficult to achieve a wide angle. Moreover, it is difficult to avoid interference between the optical path and components. On the other hand, if the upper limit is disregarded, the degree of eccentricity is so large that it is difficult secure satisfactory optical performance. More preferably, it is preferable that |θ2| be in the range from 25° to 45°. The range from 25° to 45° is one in which a proper balance is achieved between optical performance and wideness of angle. Incidentally, in Examples 1 to 4 presented later, the value of |θ2| is 34.1°, 34.1°, 36.0°, and 36.8°, respectively. Moreover, since it is easier to correct for aberrations resulting from eccentricity in one direction than to correct for those resulting from eccentricity in two directions, it is further preferable that a normal to the primary image surface be inclined only about an axis perpendicular to the plane PL1 mentioned above. In practical terms, with consideration given to errors inevitable in production, it is preferable that a normal to the primary image surface be inclined about an axis at 1° or less to a normal to the plane PL1.

As in the embodiments, it is preferable that the first reflective optical element (corresponding to the first mirror M1) have a reflective surface having a rotation-symmetric shape, and that the second reflective optical element (corresponding to the second mirror M2) have a reflective surface having a rotation-symmetric shape. It is further preferable that the first and second reflective optical elements both have a reflective surface having a rotation-symmetric shape. In general, in an eccentric optical system or shifted optical system, using an optical surface having no axis of rotation symmetry is effective in correction aberrations. However, such an optical surface has a complicated shape, and is thus difficult to produce and evaluate. Thus, an optical surface having no axis of rotation symmetry is unsuitable for aiming at lower costs. Giving a rotation-symmetric reflective surface to one, or preferably both, of the first and second reflective optical elements makes it comparatively easy to obtain highly accurate surface shapes. This makes the reflective optical elements easy to produce and evaluate, and thus helps reduce the cost of the projection optical system.

In a projection optical system including a reflective optical element, typically, as a wider angle is aimed at, the degree of eccentricity increases. Here, "eccentricity" denotes that an optical element is translationally displaced or rotationally inclined relative to a normal to the primary image surface. In a case where a reflective optical element has an axis of rotation symmetry, as the degree of eccentricity increases, the axis of rotation symmetry may fall out of the effective optical path area of the surface. In this case, it is preferable that the reflective surface be formed by a method involving turning such as injection molding, pressing, or cutting so as to increase the positioning accuracy of the reflective optical element by exploiting the characteristics of the method.

According to one way of increasing the position accuracy, a fixed rotation-symmetric bump or dent including an axis of rotation symmetry is formed on a reflective surface, and the outer periphery of the bump or the inner periphery of the dent is used as a reference surface with reference to which to perform positioning in the direction of the axis of rotation symmetry and in a direction perpendicular thereto. Since at least part of the shape of the above bump or dent is conical or cylindrical, that part can be used as a reference surface. By this method, the surface within the effective optical path area and the reference surface can be shaped in a single process, and thus it is possible to achieve highly accurate positioning relative to the optical surface shape. Alternatively, higher positioning accuracy may be aimed at by forming an arbitrary flat portion in the above bump or dent by correcting the mold or die used in injection molding or pressing. Thus, the bump or dent may be shaped other than conical or cylindrical. It is also possible to use, as a reference for positioning, a combination of the above bump or dent and at least one point or line outside the effective optical path area of the reflective optical element. This makes it possible to highly accurately set the inclination of the reflective optical element. Moreover, by producing the at least one point or line by turning, it is possible to adjust the inclination with the same accuracy as the optical surface.

It is preferable that the above bump or dent be so shaped as to include an axis of rotation symmetry and exert an optical effect of making light converge or diverge. By shining a light beam onto a surface having such a shape, then detecting the position and inclination of the reflective optical element by using the reflected or transmitted light beam, and then adjusting, based on the results of the detection, the position and the inclination of the reflective optical element, it is possible to position the reflective optical element with higher accuracy. Moreover, by forming a spherical surface about a center at an arbitrary point outside the effective optical path area of the reflective optical element, it is possible to adjust the inclination of the reflective optical element about that point. If the surface is not spherical but cylindrical, it is possible to adjust the inclination of the reflective optical element within an arbitrary plane.

As described earlier, it is easier and more inexpensive to produce and evaluate a rotation-symmetric optical surface that can be produced by turning than a surface shape having no axis of rotation symmetry. One reason is as follows. A rotation-symmetric optical surface can be produced by processing that combines two-dimensional movement with rotation about one axis. Production of an optical surface having no axis of rotation symmetry requires either a combination of two or more sets of two-dimensional movement or three-dimensional movement. This makes it more difficult to obtain high accuracy, and increasing the processing time. Thus, in a projection optical system, the larger an optical element physically is, the larger the increase in costs it contributes to is. Accordingly, it is preferable, in the projection optical system, that the optical surface of physically the largest optical element be given a rotation-symmetric shape, and that the optical surfaces of physically smaller optical elements be given non-rotation-symmetric optical powers.

In the embodiments, a non-rotation-symmetric lens element AL having a non-rotation-symmetric aspherical surface is provided in the refractive lens group GU. It is preferable that, in this way, the refractive lens group includes a non-rotation-symmetric lens element and this non-rotation-symmetric lens element has at least one non-rotation-symmetric surface having at most one plane of symmetry. As described above, to achieve a wide angle, a projection optical system including a reflective optical element is required to be a shifted or non-axial system. In either system, the optical aberrations on the secondary image surface are non-rotation-symmetric with respect to the center of the secondary image surface, and thus the non-axis-symmetric aberrations produced cannot be corrected for with a rotation-symmetric surface. To correct for them, it is preferable to use a non-rotation-symmetric surface shape, and, by using a non-rotation-symmetric optical surface in the projection optical system, it is possible to obtain good image surface flatness and a good aberration balance over the entire area of the secondary image surface. Similar effects can be obtained by combining together a plurality of eccentric rotation-symmetric optical elements. This, however, requires, as compared with when a non-rotation-symmetric optical surface is used, a larger number of optical elements and a more complicated holding structure. Thus, by combining together a coaxial system, a non-rotation-symmetric optical surface, and an eccentric rotation-symmetric surface, it is possible to achieve lower costs while maintaining high performance.

As described earlier, the larger a non-rotation-symmetric optical surface is, the higher its cost. From this point of view, it is preferable to use a non-rotation-symmetric optical surface in a refractive optical element rather than in a reflective optical element. In general, reflective surfaces are more sensitive to errors in the surface shape than refractive surfaces, and the errors produced in the surface shape during production greatly degrade the their optical performance. On the other hand, refractive optical elements, which can generally have refractive indices of the order of 1.4, helps reduce the influence of production errors, and thus helps keep the sensitivity to errors comparatively low. For the same reasons, it is preferable that the optical surface having a non-rotation-symmetric surface shape be given a weak optical power.

It is preferable that one surface of the non-rotation-symmetric lens element be given a rotation-symmetric surface shape. As compared with giving both surfaces of the non-rotation-symmetric lens element rotation-symmetric surface shapes, giving only one surface thereof a rotation-symmetric surface shape helps simplify the production and evaluation of the lens element. Moreover, it is preferable that the curvature of the rotation-symmetric surface formed as one lens surface be equal or close to the curvature of the non-rotation-symmetric surface formed as the other lens surface. This construction helps reduce the optical power, and thus helps reduce the sensitivity to errors. It is preferable that, with respect to the non-rotation-symmetric lens element, the unit incidence vector of the aforementioned central principal ray be substantially coincident with the unit emergence vector thereof. This construction helps reduce the sensitivity of the non-rotation-symmetric lens element to eccentric errors.

As will be understood from FIGS. 5 to 8, in all the embodiments, an optical construction is adopted in which the optical axis AX1 of the refractive lens group GU is inclined relative to a normal to the primary image surface SO. It is preferable that, in this way, the optical axis of the refractive lens group be inclined relative to a normal to the primary image surface. As described earlier, in a case where no reflective optical element having no optical power is disposed between reflective and refractive surfaces having optical powers, to avoid interference between the optical path and structural components, the reflective surface having an optical power needs to function as one having no optical power. For example, in a case where the reflective surface is so shaped as to have an axis of rotation symmetry, the axis of rotation symmetry of the reflective surface needs to be inclined relative to a normal to the primary image surface. This is equivalent to inclining the optical power distribution of the reflective optical element relative to a normal to the primary image surface. Thus, by correspondingly inclining the optical power distribution of the refractive lens group, it is possible to compensate for the eccentricity of the optical power distribution through the entire projection optical system.

Suppose that the most primary-image-surface-side lens element along the optical path of the refractive lens group has an optical surface having a rotation-symmetric aspherical shape, let the vertex of this aspherical surface be Ao, let the vector from the vertex Ao toward the point at which the axis of rotation symmetry of the aspherical surface intersects the other surface of the same lens element be Avx, and let the vector perpendicular to the vector Avx be Avy, and moreover, in the two-dimensional coordinate system formed by the vectors Avx and Avy with the origin at the vertex Ao, let a value in the direction of the vector Avx be represented by Ax, let a value in the direction of the vector Avy be represented by Ay, and let the shape of the aspherical surface be defined as Ax=f(Ay), then it is preferable that the second derivative function f(Ay)" of f(Ay) have at least either a maximum (a maximal value) or a minimum (a minimal value) within the range fulfilling conditional formula (FA) below.

$$0 < Ay < Rmax \quad (FA)$$

where

Rmax represents the effective optical path radius of the aspherical surface.

Using an aspherical surface near the pupil makes it possible to correct for coma and other aberrations. Thus, for example in an rear-aperture optical construction, disposing an aspherical surface on the most primary-image-surface-side lens element makes it possible to effectively correct for coma and other aberrations. By designing the function f(Ay), which represents the shape of the aspherical surface, in such a way that the second derivative f(Ay)" thereof has at least either a maximum or a minimum within the range given by conditional formula (FA), it is possible to obtain high coma correction performance. The fact that the second derivative f(Ay)" has a maximum or a minimum means that, when the aspherical surface shape f(Ay) are divided at equal intervals in the direction of the vector Avy, the length of each divided line first reach a maximum and then reduces within the range given by conditional formula (FA). An aspherical surface having such a shape can reverse the effect of coma on the rays that pass through the lens element at different positions, and also exhibits a high degree of freedom to obliquely incident rays, resulting in high coma correction performance.

Furthermore, within the range in which conditional formula (FA) noted above is fulfilled, it is preferable that the first derivative f(Ay)' of f(Ay) have at least one maximum and a minimum. With this construction, the surface shape with a higher degree of freedom helps obtain higher coma correction performance.

In all the embodiments, the most primary-image-surface SO side lens surface S3 is formed as an aspherical surface, with a flat or spherical surface disposed at the back thereof. It is preferable that, in this way, the primary-image-surface-side lens surface of the most primary-image-surface-side lens element be formed as an aspherical surface, and that the lens surface at the back of that lens surface be formed as a flat or spherical surface. Forming the secondary-image-surface-side lens surface of the most primary-image-surface-side lens element as a flat or spherical surface makes it easy, by using that surface as a reference surface, to adjust the eccentricity of the aspherical surface. For example, if the aspherical surface has a flat surface at the back, by adjusting the eccentricity of the entire lens element within the flat surface, it is possible to easily perform translational eccentricity adjustment. If the aspherical surface has a spherical surface at the back, it is possible to easily perform, about the center of the curvature thereof, inclination eccentricity adjustment of the aspherical surface. This makes it easy to design the structure of the lens barrel including the succeeding lens elements.

As will be understood from FIGS. 5 to 8, in all the embodiments, an optical construction is adopted that is non-telecentric toward the primary image surface SO side. It is preferable that, in this way, the projection optical system be non-telecentric toward the primary image surface side. A non-telecentric arrangement so designed that the initial rays of the principal rays traveling from the primary image surface to the refractive lens group are convergent rather than parallel eliminates the need to use an extra element having a negative optical power to correct for the positive Petzval value produced by the second reflective optical element having a negative optical power. This makes it easy to obtain good optical performance with a small number of lens elements. Moreover, this reduces the width of the light beam that is incident on the optical element, and is thus suitable for making the optical element compact. Furthermore, it is preferable that the pupil of the projection optical system be located between the primary image surface SO and the most secondary-image-surface-side lens element of the refractive lens group GU. This helps make the most of the effects of the non-telecentric optical construction.

As will be understood from FIGS. 5 to 8, in all the embodiments, an aperture stop ST is disposed near the most primary-image-surface SO side lens element along the projection optical path. It is preferable that, in this way, the aperture stop of the projection optical system be disposed near the most primary-image-surface-side lens element along the projection optical path. With this construction, when consideration is given to interference with the illumination light for illuminating the primary image surface, there is no need to narrow the light beam width with an optical element having a positive optical power or the like. Thus, there is no longer any need to give consideration to interference with the light beam that may occur if such a positively powered lens element is present.

EXAMPLES

Hereinafter, practical examples of projection optical systems embodying the present invention will be presented with reference to their construction data and other data. Examples 1 to 4 presented below are numerical examples corresponding to the first to fourth embodiments described above, and the optical construction diagrams (FIGS. 1 to 8) showing the embodiments also show the optical arrangement, projection optical path, and other features of the corresponding examples.

Tables 1 to 4, Tables 5 to 8, Tables 9 to 12, and Tables 13 to 16 show the optical construction of Examples 1 to 4, respectively. Of these tables, Tables 1 and 2, Tables 5 and 6, Tables 9 and 10, and Tables 13 and 14 show, in the form of construction data, the optical arrangement of the entire system, specifically from the primary image surface SO (corresponding to the object surface in enlargement projection) on the reduction side to the secondary image surface SI (corresponding to the image surface in enlargement projection) on the enlargement side. In the construction data (1 of 2), Sn (n=1, 2, 3, . . . ) represents the n-th surface counted from the reduction side, with its radius of curvature represented by CR (mm) and the axial distance from that surface to the surface located on the enlargement side thereof represented by T (mm), and the refractive index to the d-line and the Abbe number of the medium filling the axial distance T are represented by Nd and vd, respectively. The glass plate GP that provides the surfaces S1 and S2 is the cover glass covering the primary image surface SO. For the aperture stop ST, the radius of the aperture is shown together.

In all the examples, the global coordinate system has its origin Go at the center of the primary image surface SO, and any vector therein is defined by mutually perpendicular unit vectors VX (1, 0, 0), VY (0, 1, 0), and VZ (0, 0, 1). Thus, the origin o of the primary image surface SO in the construction data (2 of 2) is identical with the origin Go. The vector VX is a unit vector that is parallel to a normal to the primary image surface SO and that, starting at the origin Go, points to the surface located next to the primary image surface SO on the secondary image surface SI side thereof. The vector VY is a unit vector that is perpendicular to the unit vector VX and that, starting at the origin Go, points to the secondary image surface SI in the direction of the shorter sides of the primary image surface SO. The vector VZ is defined, on a right hand system basis, as starting at the origin Go and perpendicular to the vectors VX and VY. The global coordinates at the vertex of each surface are as listed in the construction data (2 of 2). In the construction data (1 of 2), the radius of curvature CR of each surface is given a positive or negative sign "+" or "−" with respect to the x-axis of the local rectangular coordinate system, with a positive sign indicating that the center of curvature is located in the positive direction on the vector VX. In a coaxial portion (block), definitions are given by the use of axial distances T. Specifically, let a particular surface within a coaxial block be SLi, let the most primary image surface SO side surface within the block to which the surface SLi belongs be SL, let the vertex thereof be Lo, and the vector vx (unit vector) of the surface SL be Lovx. Then, the vertex of the surface SLi is located at the position (Li) displaced from the vertex Lo in the direction of the vector Lovx by the distance equal to the sum of the axial distances T associated with all the surfaces up to the one immediately in front of the surface SLi within the block. The global coordinates of the surface SLi are equal to those obtained by replacing the origin Lo of the global coordinates of the surface SL with Li. Incidentally, although the surface S12 is not rotation-symmetric about the optical axis AX1, since the plane tangent to the surface S12 at the intersection between the optical axis AX1 and the surface S12 is perpendicular to the optical axis AX1, the coordinates of the surface S12 can be defined as if it belongs to a coaxial lens element; thus, in the construction data, the coordinates of the surface S12 are included in the relevant coaxial system.

In the construction data (part 1 of 2), a surface marked with an asterisk (*) is a rotation-symmetric aspherical surface, of which the surface shape is defined by formula (AS) below using the rectangular coordinate system (x, y, z) having the origin at the vertex of the surface. A surface marked with a dollar mark ($) is a non-rotation-symmetric extended aspherical surface, of which the surface shape is defined by formula (BS) below using the rectangular coordinate system (x, y, z) having the origin at the vertex of the surface. Tables 3, 7, 11, and 15 show the rotation-symmetric aspherical surface data, and Tables 4, 8, 12, and 16 show extended aspherical surface data. It should be noted that the coefficient of any unlisted term equals zero, and that, for all the data, "E−n" stands for "×10$^{-n}$" and "E+n" stands for "×10$^{+n}$."

$$x = (C0 \cdot h^2)/\left(1 + \sqrt{1 - \varepsilon \cdot C0^2 \cdot h^2}\right) + \sum (Ai \cdot h^i) \qquad (AS)$$

$$x = (C0 \cdot h^2)/\left(1 + \sqrt{1 - \varepsilon \cdot C0^2 \cdot h^2}\right) + \sum (Bjk \cdot y^j \cdot z^k) \qquad (BS)$$

where x represents the displacement from the reference surface in the x-axis direction as measured at the height h (relative to the vertex);

h represents the height in a direction perpendicular to the x-axis ($h^2 = y^2 + z^2$);

C0 represents the curvature at the vertex (=1/CR);

$\varepsilon$ represents the quadric surface parameter;

Ai represents the aspherical coefficient of i-th order; and

Bjk represents the extended aspherical coefficient of j-th order with respect to y and k-th order with respect to z.

Table 17 shows the image size (mm) on the primary image surface SO and the projection magnification. The image on the primary image surface SO is rectangular, with the ±Y-direction of the primary image surface SO aligned with the direction of the shorter sides of the image and the ±Z-direction of the primary image surface SO aligned with the direction of the longer sides of the image. The projection magnification is calculated through paraxial tracing performed by using as the "central principal rays" the rays that pass through the center of the primary image surface SO and the center of the aperture stop ST. Specifically, βy is the absolute value of the projection magnification calculated through paraxial tracing on the XY-section, and βz is the absolute value of the projection magnification in the direction perpendicular to βy. Table 18 shows the data of and related to conditional formulae (1) and (1a) as actually observed in each example.

Figure 9:
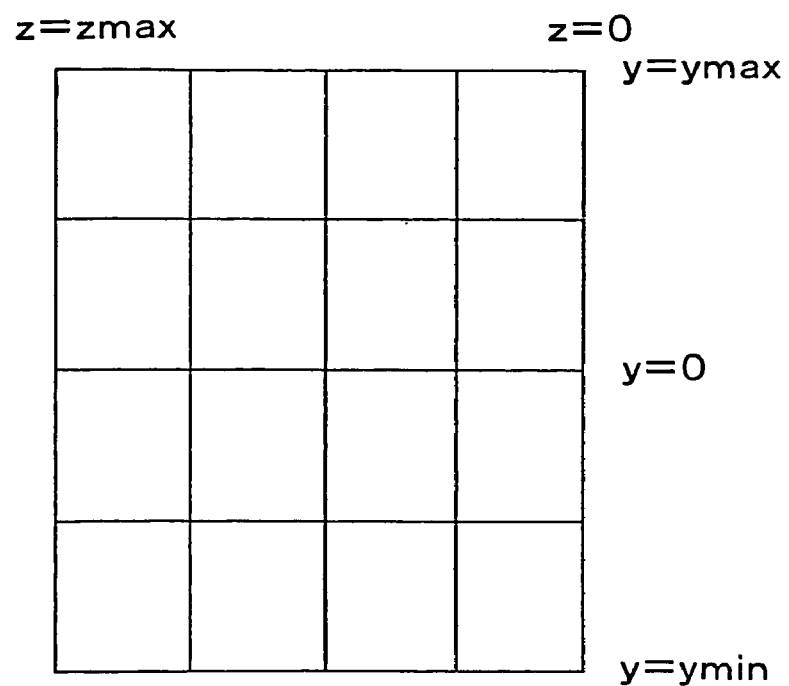
FIG. 9 is a distortion diagram of Example 1.
Figure 10:
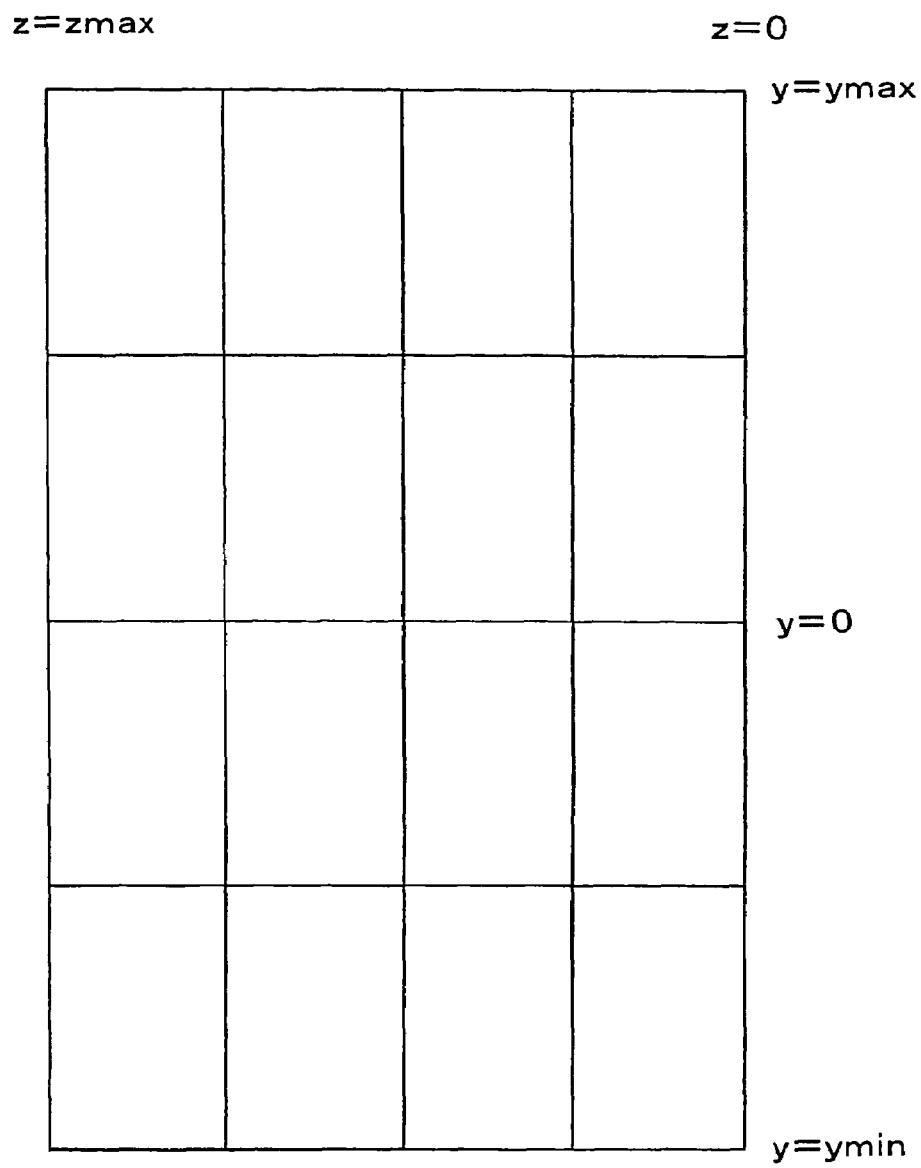
FIG. 10 is a distortion diagram of Example 2.
Figure 11:
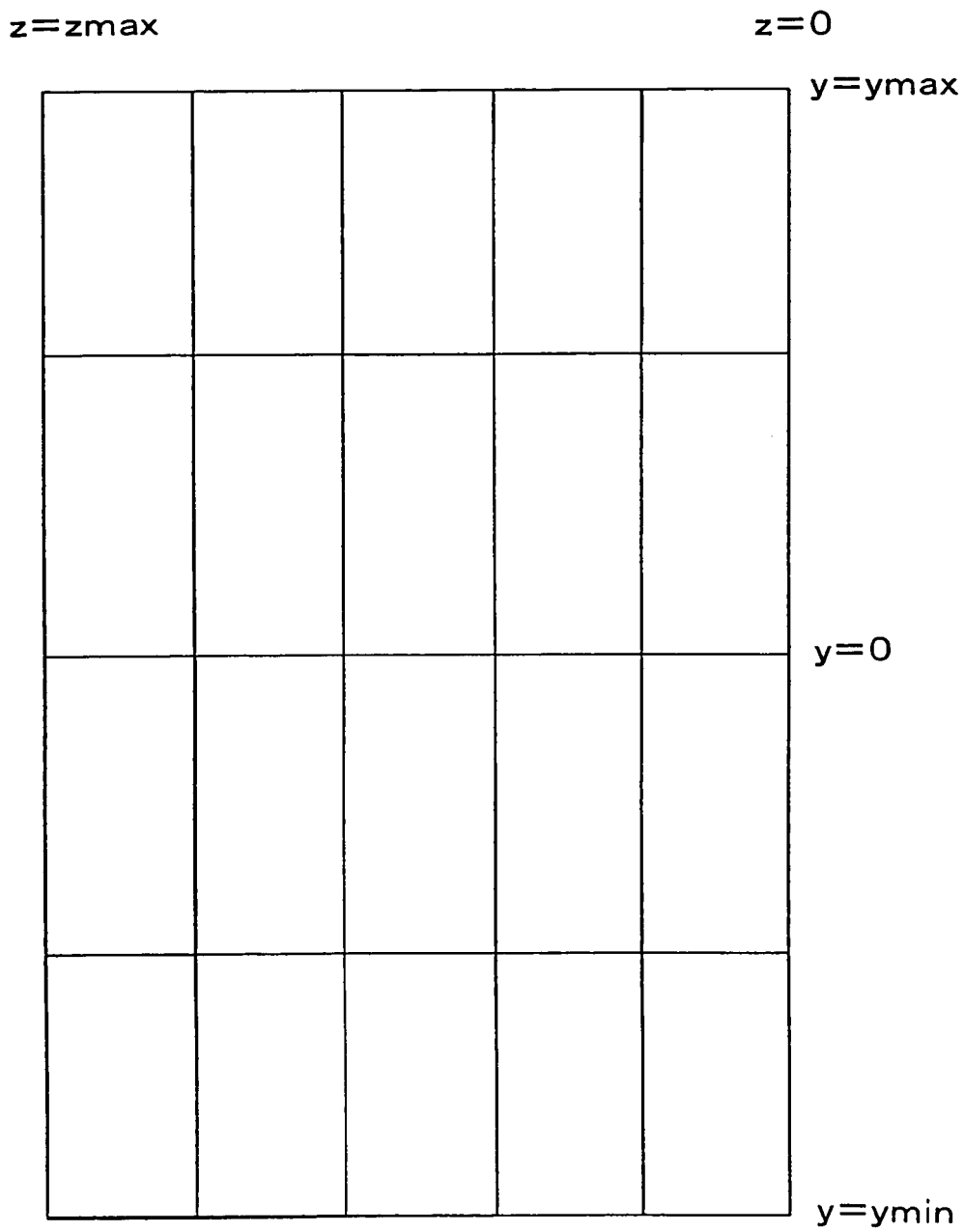
FIG. 11 is a distortion diagram of Example 3.
Figure 12:
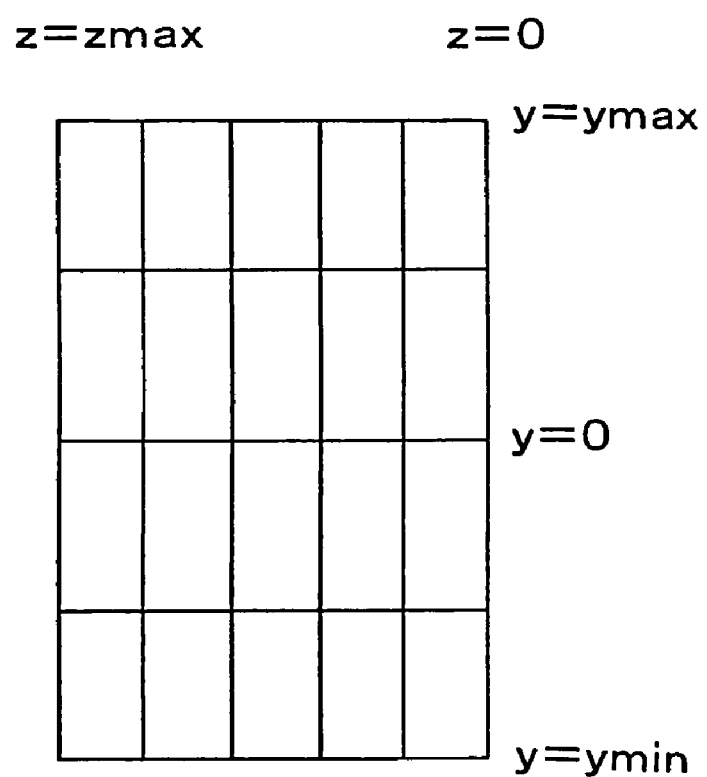
FIG. 12 is a distortion diagram of Example 4.

FIGS. 9 to 12 are distortion diagrams showing the distortion observed in Examples 1 to 4, respectively. Each distortion diagram shows the ray positions (at a wavelength of 546 nm) on the secondary image surface SI corresponding to a rectangular grid on the primary image surface SO. Specifically, imaginary straight lines are drawn at equal intervals in both the directions of shorter and longer sides of the primary image surface SO, and the deviations of the barycenters from the ideal projection positions obtained by projecting the intersections of those lines onto the secondary image surface SI are connected together to obtain a distortion grid, which is shown in each distortion diagram. Broken lines indicate the ideal projection positions (without distortion) of the respective points, i.e., the positions occupied in the local coordinate system (y, z) with respect to the secondary image surface SI by the values calculated by multiplying by the projection magnifications βy and βz the original coordinates in the local coordinate system (y, z) with respect to the primary image surface SO. In the diagrams, ymax, ymin, and zmax respectively represent the maximum value of y, the minimum value of y, and the maximum value of z in the local coordinate system with respect to the secondary image surface SI. That is, ymax is equal to the value obtained by multiplying by βy the maximum value of the image size in the Y-direction on the primary image surface SO, ymin is equal to the value obtained by multiplying by βy the minimum value of the image size in the Y-direction on the primary image surface SO, and zmax is equal to the value obtained by multiplying by βz the maximum value of the image size in the Z-direction on the primary image surface SO. Since all the examples adopt an optical arrangement symmetric with respect to the XY-plane of the global rectangular coordinate system, the distortion diagrams cover, of the entire secondary image surface SI, only the range of z=0 to zmax, with the range of z=0 to zmin omitted.

Figure 13:
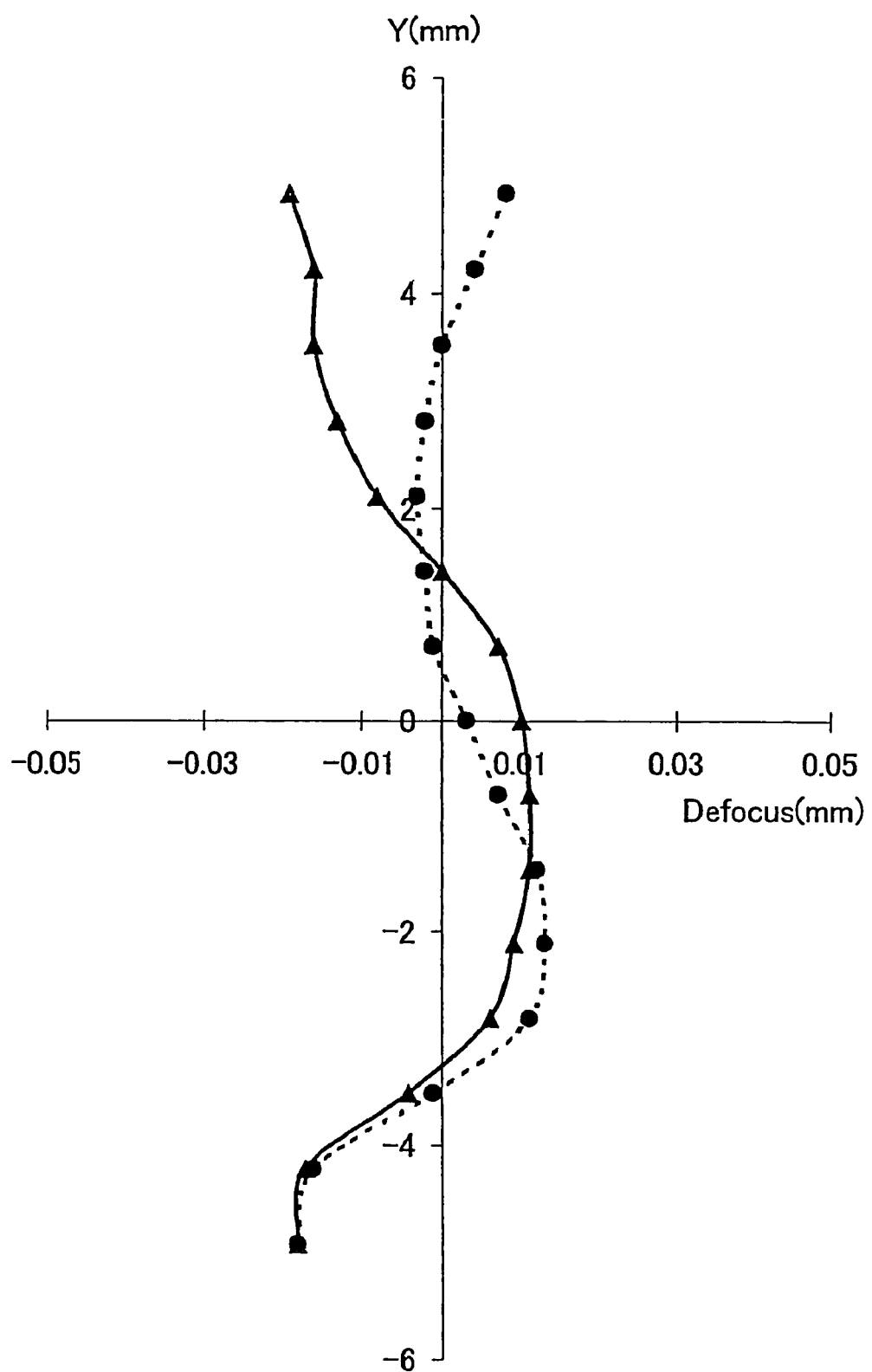
FIG. 13 is a graph showing the image surface curves of Example 1.
Figure 14:
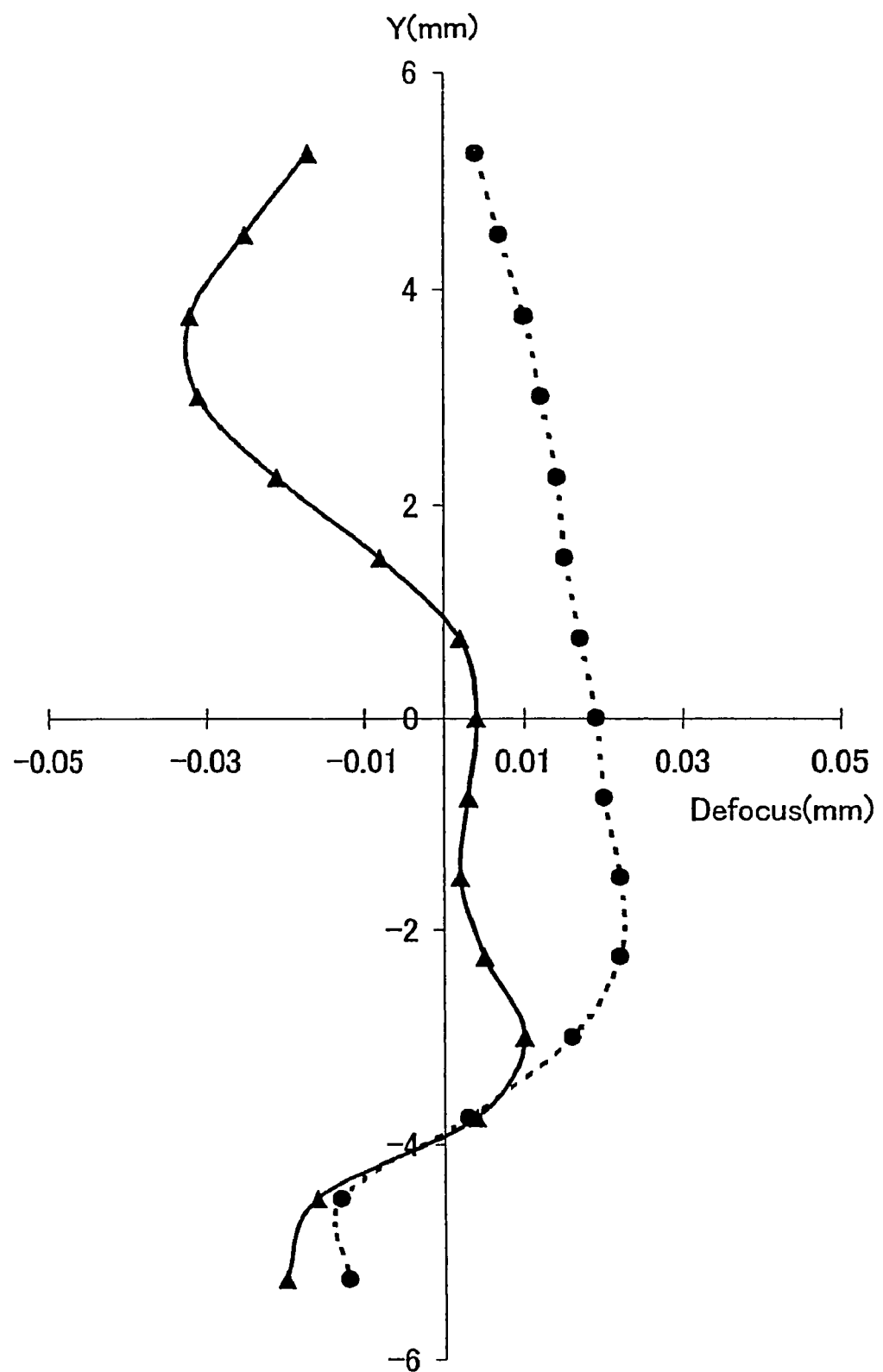
FIG. 14 is a graph showing the image surface curves of Example 2.
Figure 15:
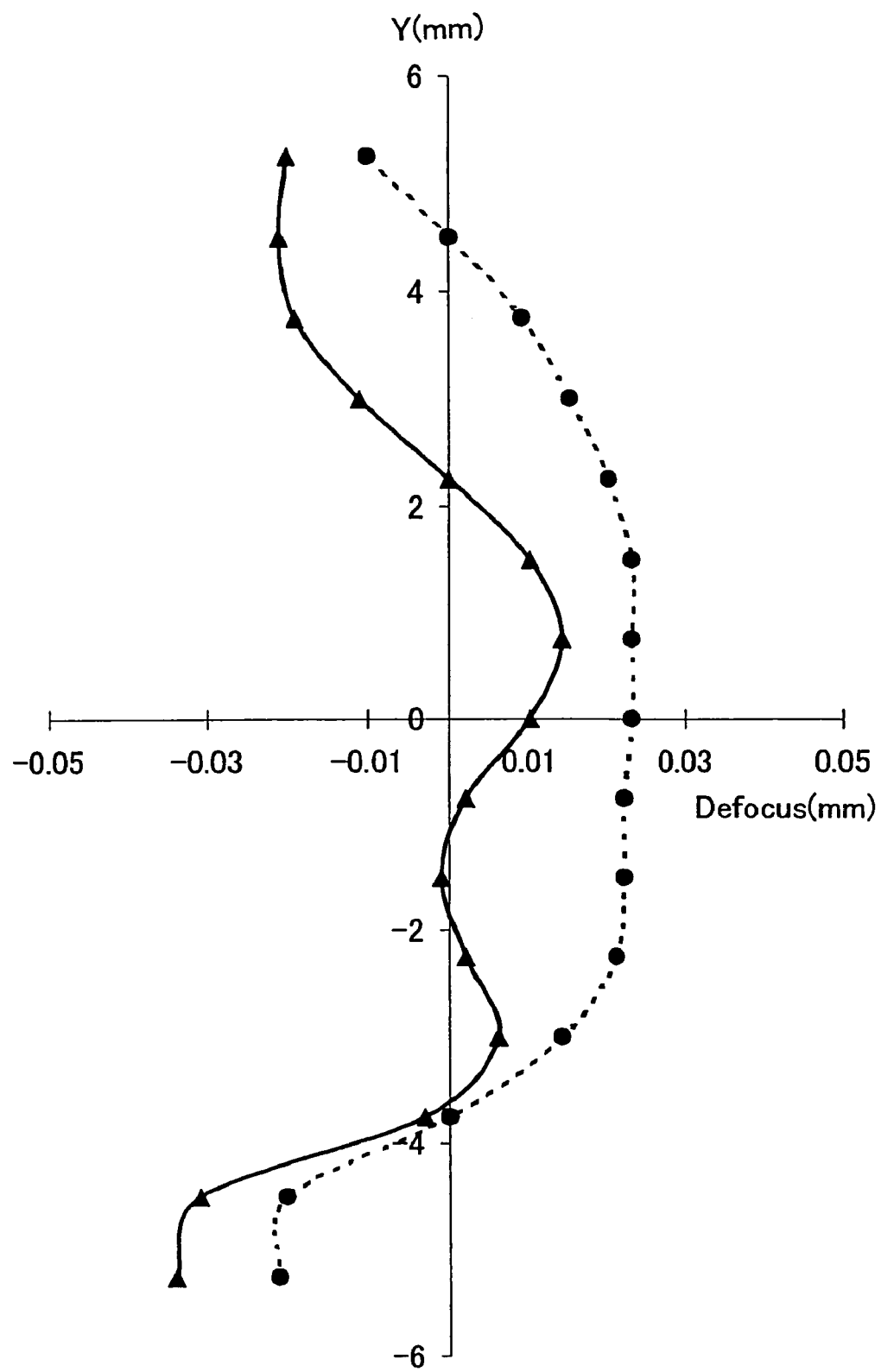
FIG. 15 is a graph showing the image surface curves of Example 3.
Figure 16:
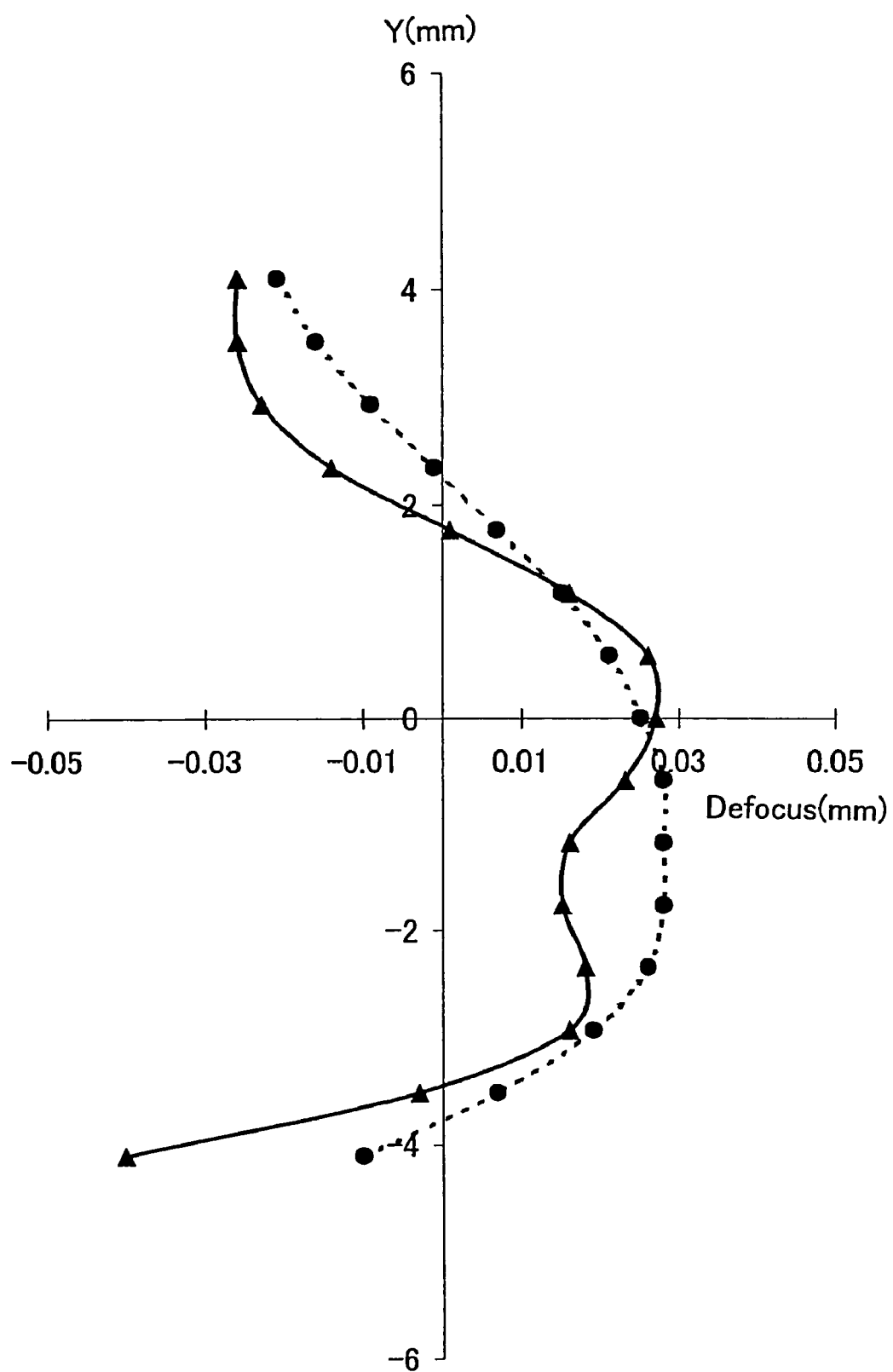
FIG. 16 is a graph showing the image surface curves of Example 4.

FIGS. 13 to 16 show the image surface curves observed in Examples 1 to 4, respectively. Each image surface curve is the result, as observed on the primary image surface SO, of optical simulation whereby reverse tracing is performed on a virtual basis from the secondary image surface SI to the primary image surface SO. A solid line passing through solid black triangular symbols indicates the positions where the resolution for Z-direction lines (horizontal line resolution) on the primary image surface SO is highest in the direction (X-direction) normal to the primary image surface SO as plotted as a function of Y and Z. On the other hand, a solid line passing through solid black circular symbols indicates the positions where the resolution for Y-direction lines (vertical line resolution) on the primary image surface SO is highest in the direction (X-direction) normal to the primary image surface SO as plotted as a function of Y and Z. In each graph, the vertical axis represents Y (mm), and the horizontal axis represents the amount of defocus (mm) in the direction (X-direction) normal to the primary image surface SO. The coordinates Y and Z exhibit correspondence as shown in Table 19.

Figure 17:
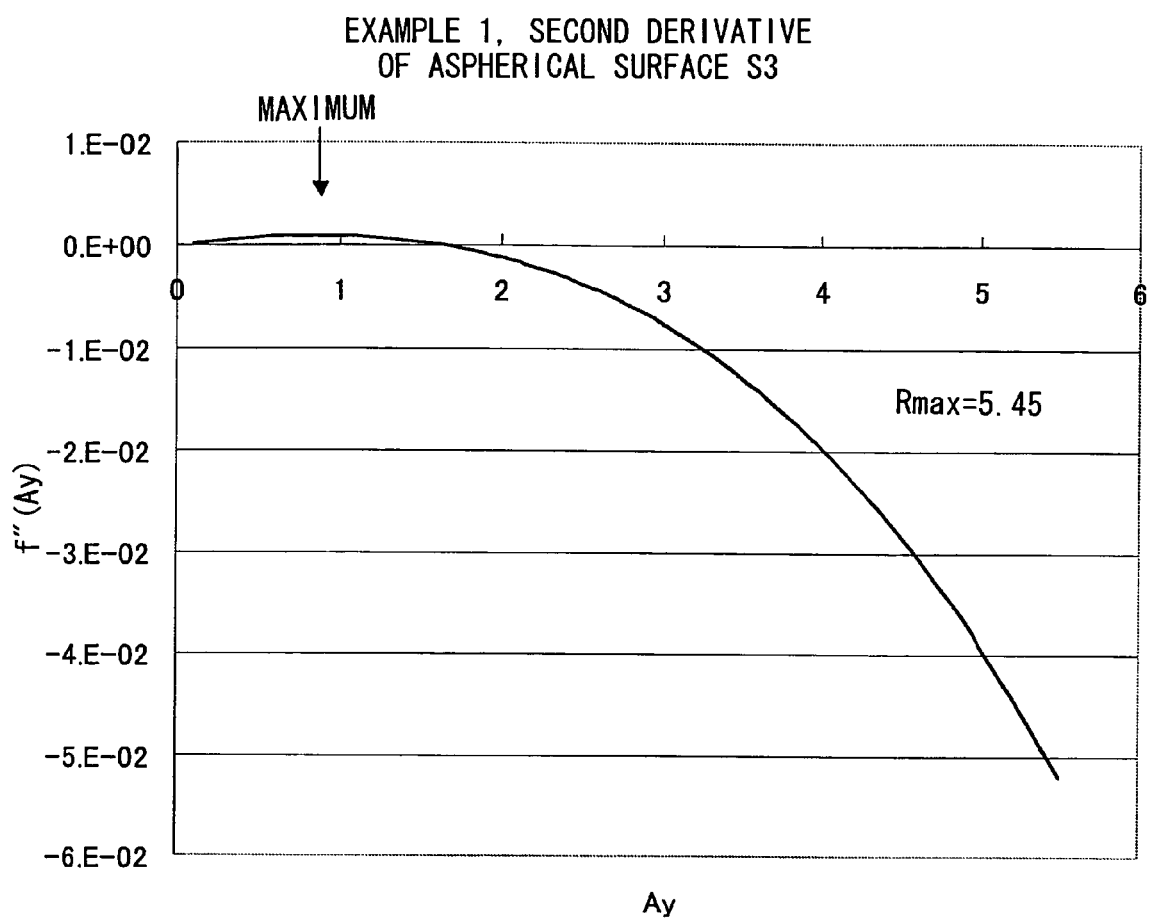
FIG. 17 is a graph showing the second-derivative function of the rotation-symmetric aspherical surface formed as the third surface in Example 1.
Figure 18:
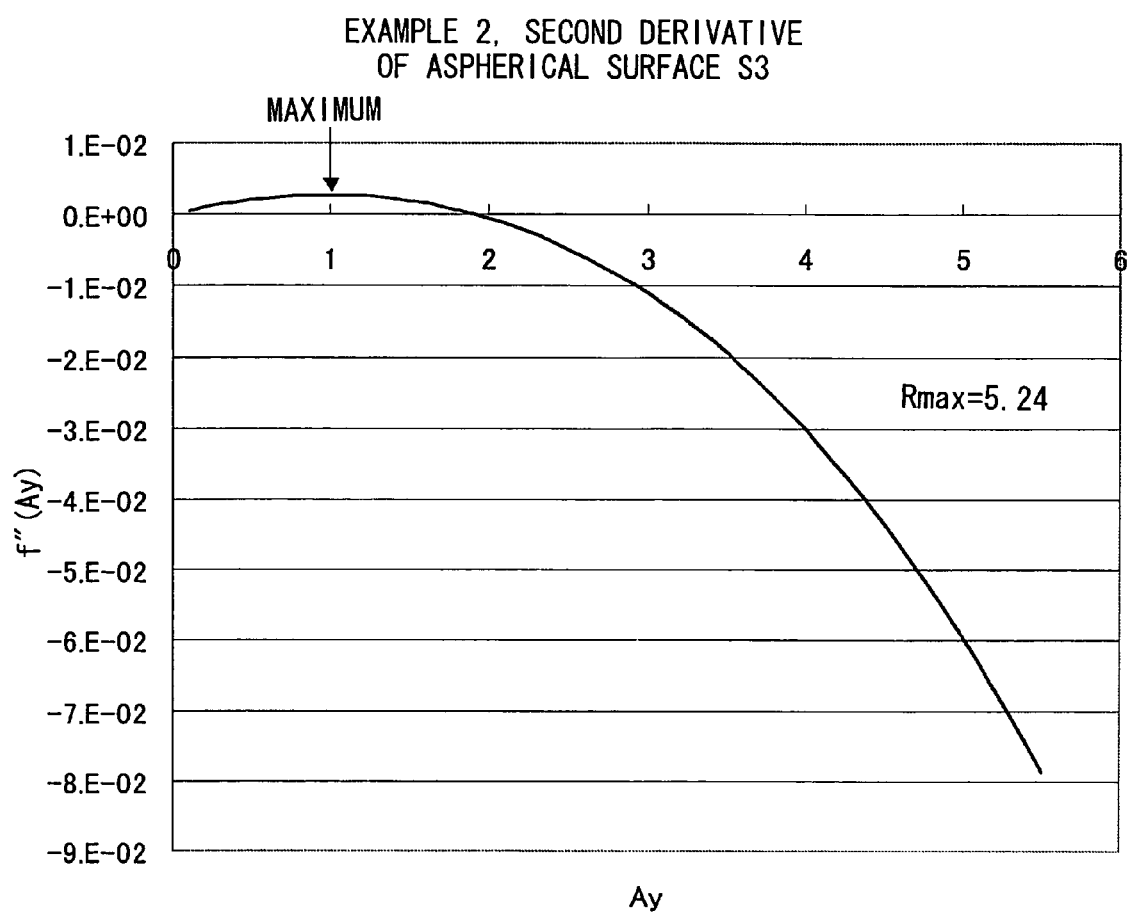
FIG. 18 is a graph showing the second-derivative function of the rotation-symmetric aspherical surface formed as the third surface in Example 2.
Figure 19:
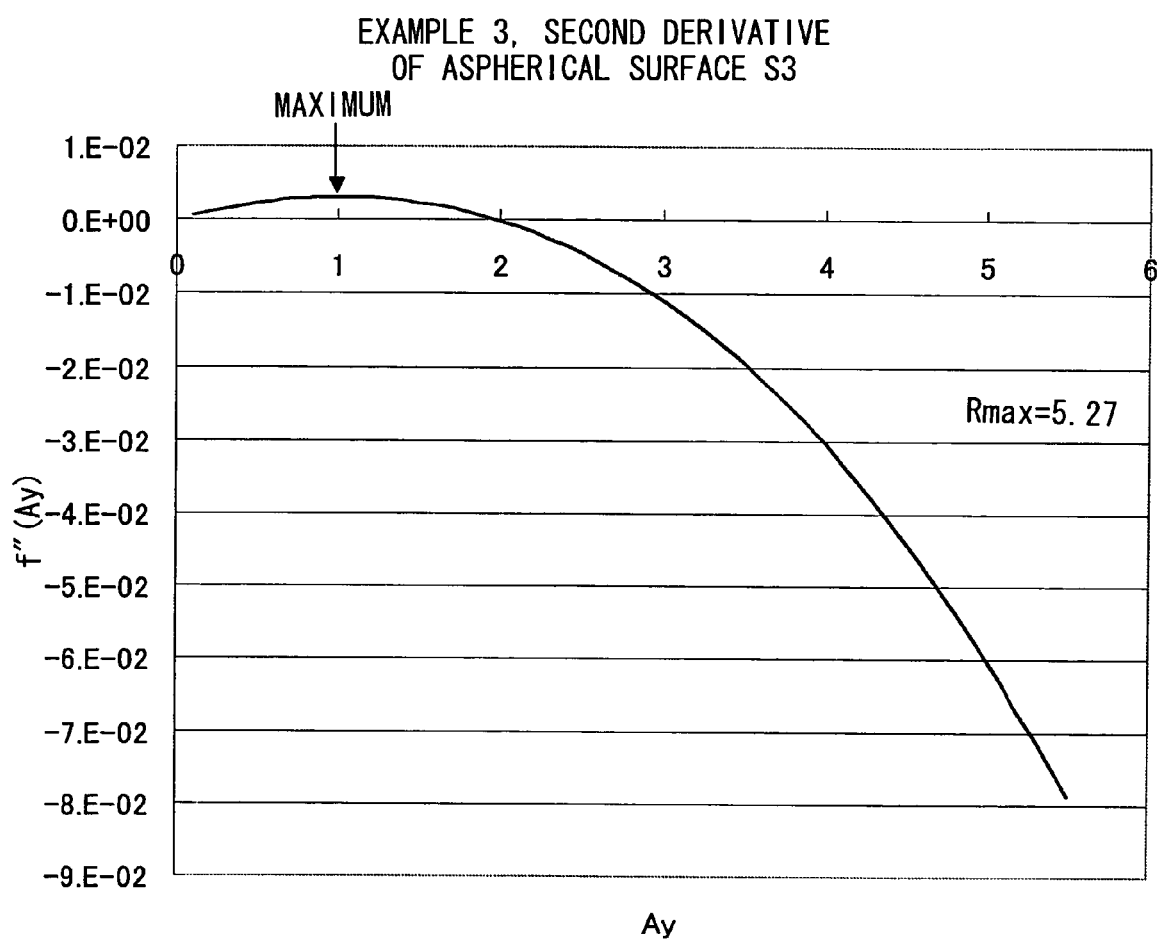
FIG. 19 is a graph showing the second-derivative function of the rotation-symmetric aspherical surface formed as the third surface in Example 3.
Figure 20:
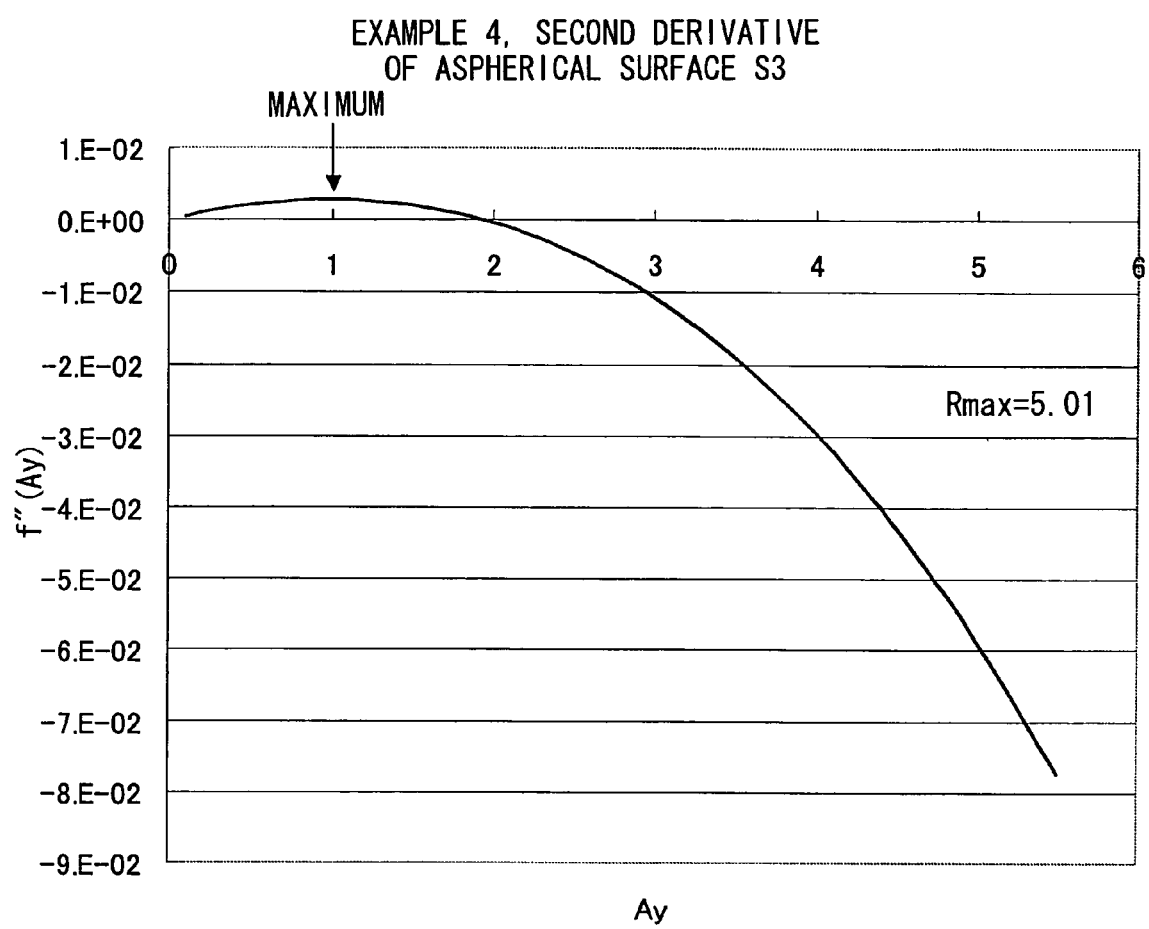
FIG. 20 is a graph showing the second-derivative function of the rotation-symmetric aspherical surface formed as the third surface in Example 4.
Figure 21:
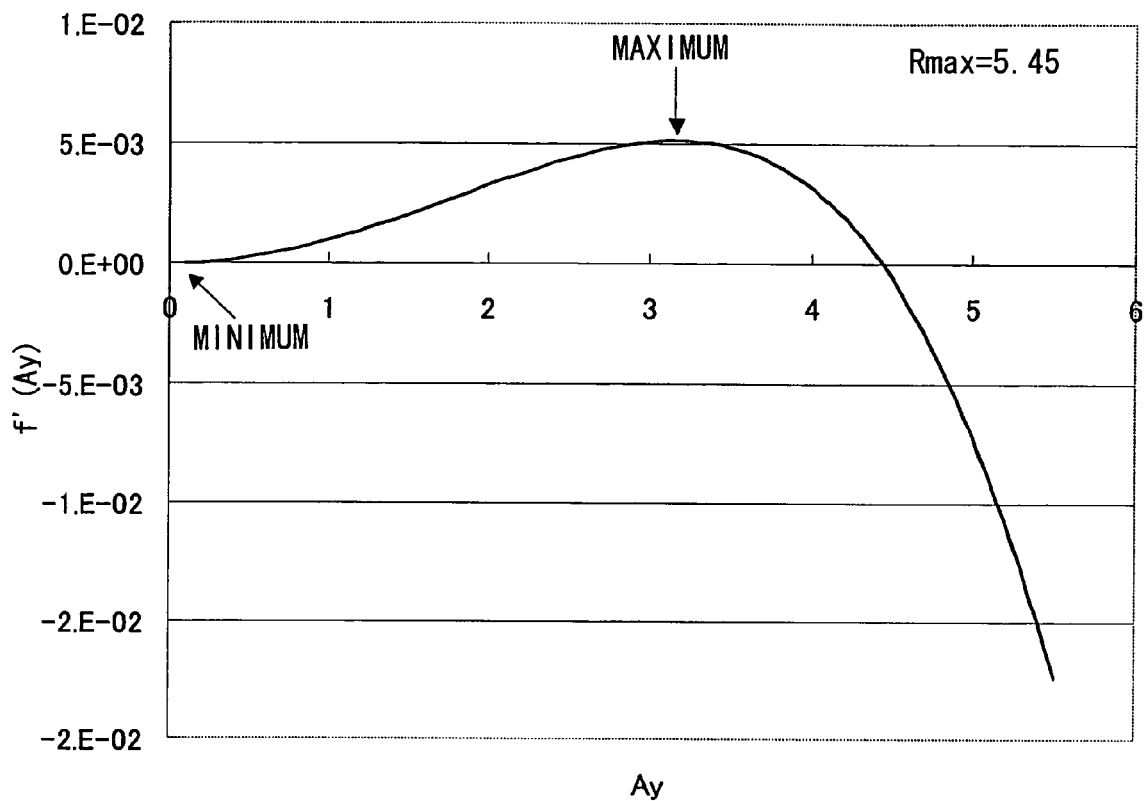
FIG. 21 is a graph showing the first-derivative function of the rotation-symmetric aspherical surface formed as the third surface in Example 1.
Figure 22:
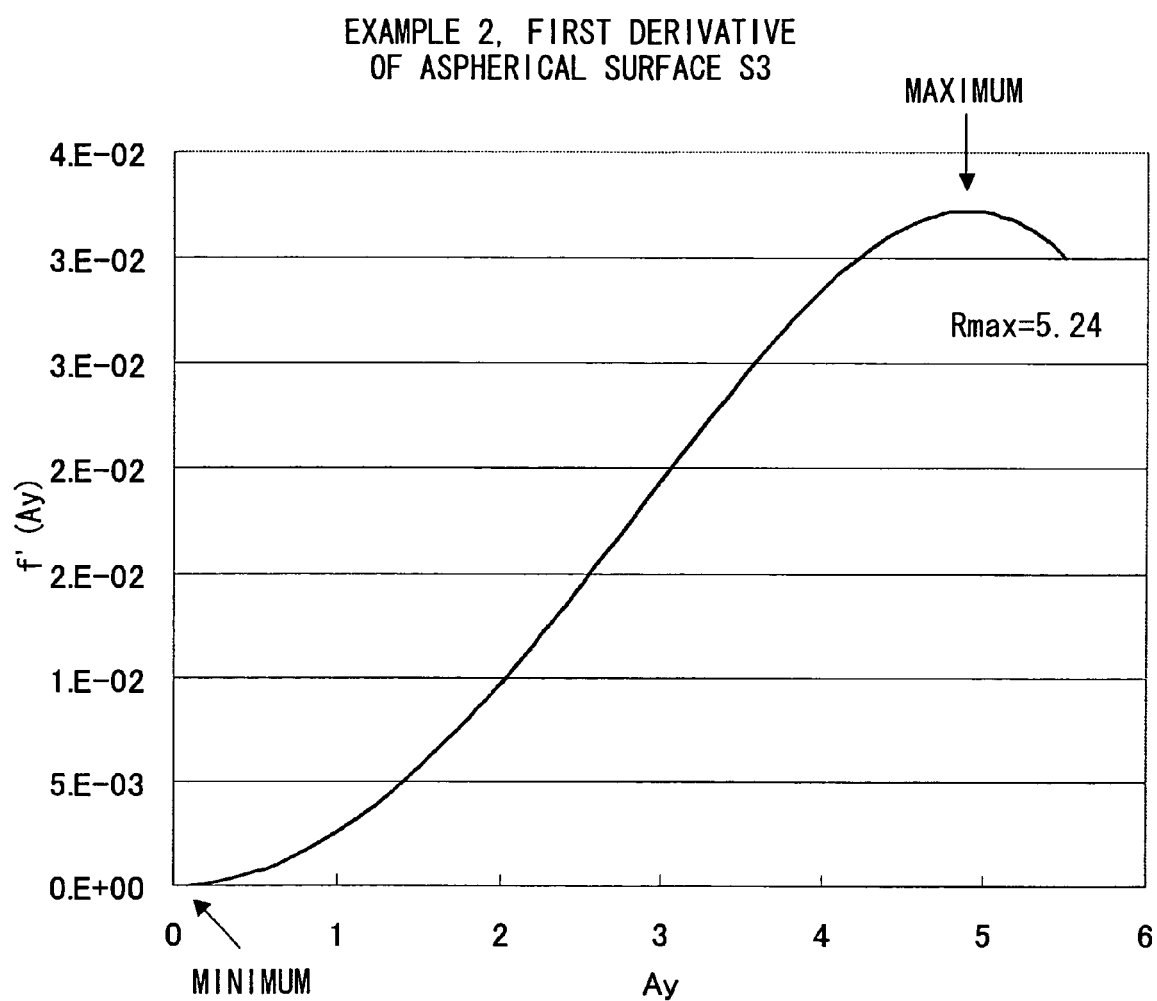
FIG. 22 is a graph showing the first-derivative function of the rotation-symmetric aspherical surface formed as the third surface in Example 2.
Figure 23:
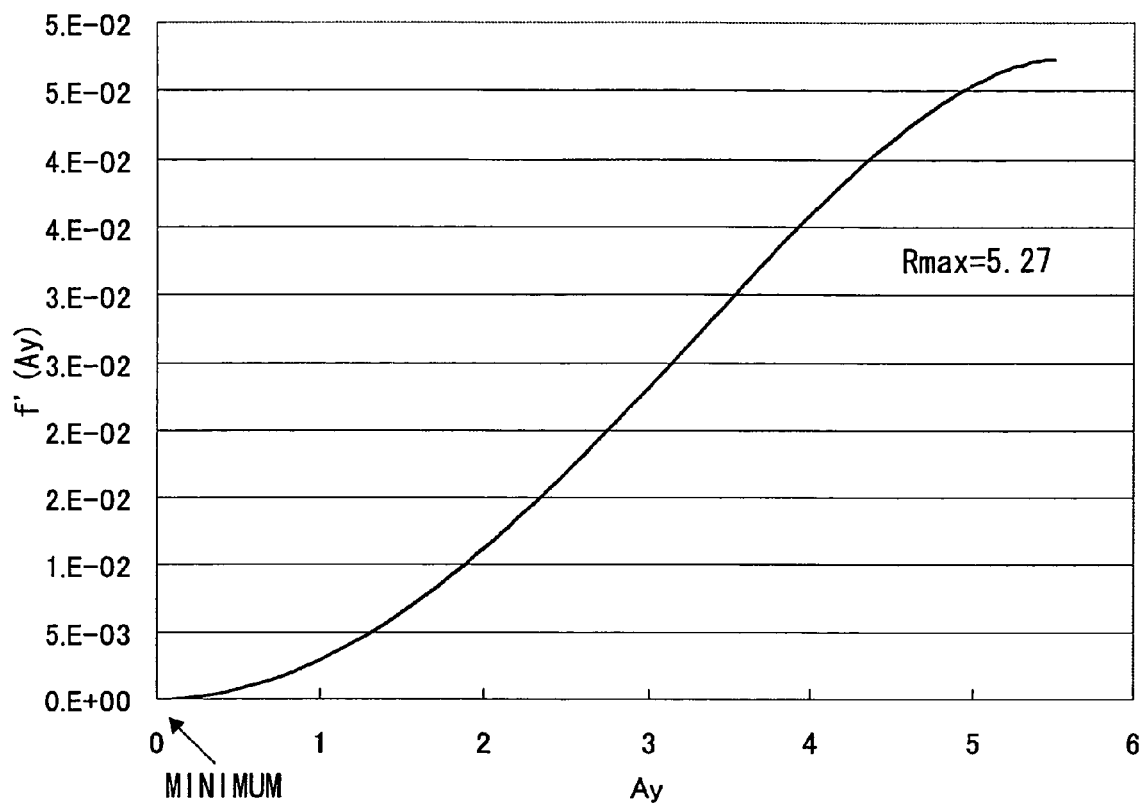
FIG. 23 is a graph showing the first-derivative function of the rotation-symmetric aspherical surface formed as the third surface in Example 3.
Figure 24:
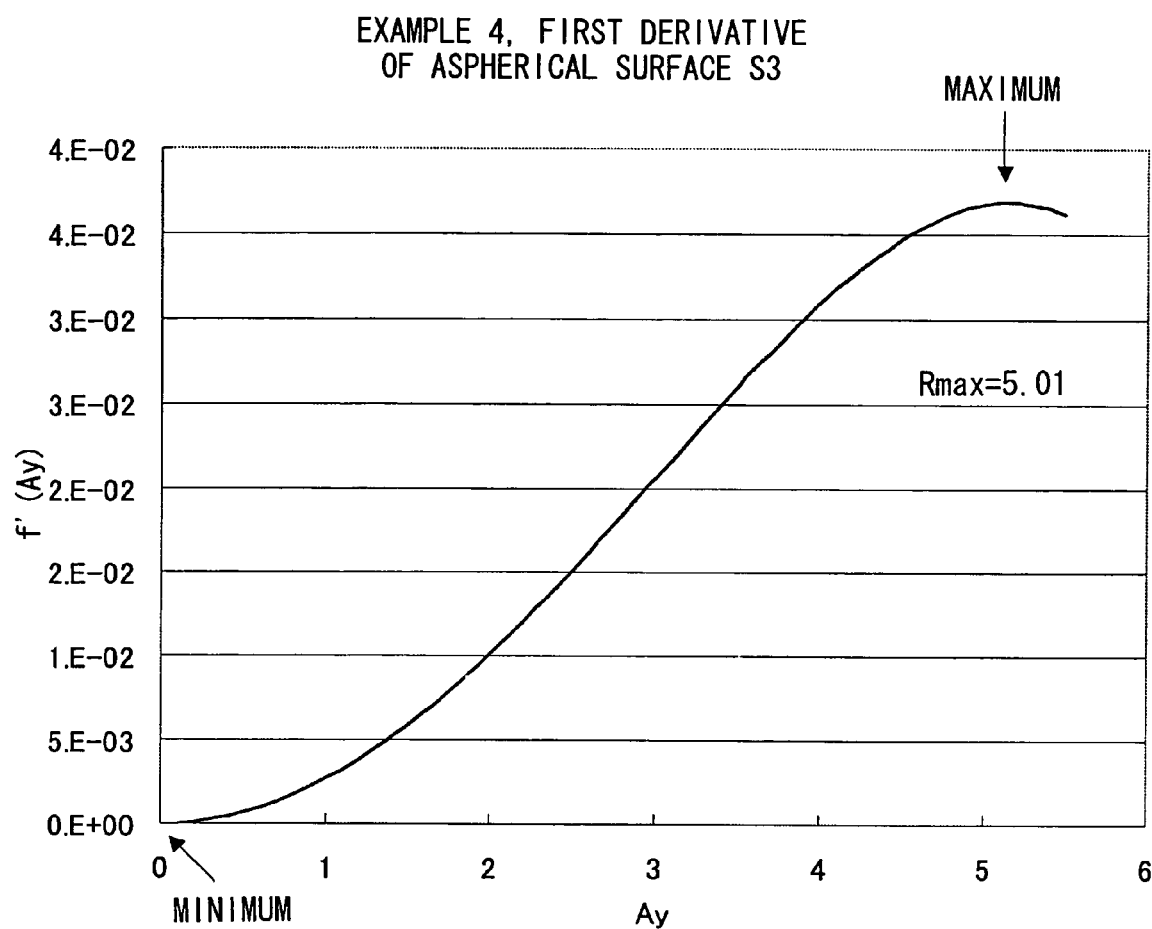
FIG. 24 is a graph showing the first-derivative function of the rotation-symmetric aspherical surface formed as the third surface in Example 4.

The second derivative function of the rotation-symmetric aspherical surface used as the third surface S3 in Examples 1 to 4 is shown, in the form of data, in Tables 20 and 21 and, in the form of graphs, in FIGS. 17 to 20. The first derivative function of the rotation-symmetric aspherical surface used as the third surface S3 in Examples 1 to 4 is shown, in the form of data, in Tables 22 and 23 and, in the form of graphs, in FIGS. 21 to 24. In Tables 20 to 23, the maximal values are indicated by hollow triangular symbols.

TABLE 1

Example 1 Construction Data (1 of 2)

| Surface | CR[mm] | T[mm] | Nd | νd | Aperture Radius |
|---|---|---|---|---|---|
| SO | ∞ | 0.5 | 1.000000 | | |
| S1 | ∞ | 3.000 | 1.508470 | 61.1900 | (GP) |
| S2 | ∞ | | 1.000000 | | |
| S3* | 489.538 | 1.842 | 1.696800 | 55.8412 | |

TABLE 1-continued

Example 1 Construction Data (1 of 2)

| Surface | CR[mm] | T[mm] | Nd | νd | Aperture Radius |
|---|---|---|---|---|---|
| S4 | ∞(ST) | 2.390 | 1.000000 | | 5.28 |
| S5 | −37.741 | 1.819 | 1.723778 | 28.8457 | |
| S6 | 19.187 | 4.851 | 1.628133 | 58.9522 | |
| S7 | −20.815 | 12.177 | 1.000000 | | |
| S8 | −90.903 | 5.429 | 1.752282 | 42.4652 | |
| S9 | −22.891 | 31.731 | 1.000000 | | |
| S10 | −19.070 | 2.000 | 1.571062 | 42.8680 | |
| S11 | −201.140 | 11.065 | 1.000000 | | |
| S12$ | −38.873 | 3.097 | 1.491400 | 57.8200 | (AL) |
| S13 | −38.873 | | 1.000000 | | |
| S14* | −239.421(M1) | | 1.000000 | | |
| S15* | 51.216(M2) | | 1.000000 | | |
| S16 | ∞(M3) | | 1.000000 | | |
| SI | ∞ | | | | |

TABLE 2

Example 1 Construction Data (2 of 2)

| Surface | Position, Vector | X | Y | Z |
|---|---|---|---|---|
| SO | o | 0 | 0 | 0 |
| | vx | 1 | 0 | 0 |
| | vy | 0 | 1 | 0 |
| | vz | 0 | 0 | 1 |
| S3 | o | 34.000 | 7.567 | 0.000 |
| | vx | 0.9990 | 0.0438 | 0.0000 |
| | vy | −0.0438 | 0.9990 | 0.0000 |
| | vz | 0.0000 | 0.0000 | 1.0000 |
| S14 (M1) | o | 131.031 | 5.058 | 0.000 |
| | vx | 0.939 | −0.344 | 0.000 |
| | vy | 0.344 | 0.939 | 0.000 |
| | vz | 0.000 | 0.000 | 1.000 |
| S15 (M2) | o | 53.012 | 73.210 | 0.000 |
| | vx | −0.800 | 0.601 | 0.000 |
| | vy | 0.601 | 0.800 | 0.000 |
| | vz | 0.000 | 0.000 | −1.000 |
| S16 (M3) | o | 138.843 | 1.608 | 0.000 |
| | vx | 0.828 | −0.560 | 0.000 |
| | vy | 0.560 | 0.828 | 0.000 |
| | vz | 0.000 | 0.000 | 1.000 |
| SI | o | 216.482 | 384.133 | 0.000 |
| | vx | −0.828 | 0.560 | 0.000 |
| | vy | −0.560 | −0.828 | 0.000 |
| | vz | 0.000 | 0.000 | 1.000 |

TABLE 3

Example 1 *: Rotation-Symmetric Aspherical Surface Data, Ai

| Surface | ε | A4 | A6 | A8 | A10 |
|---|---|---|---|---|---|
| S3 | 1.0 | −5.00466E−05 | −7.39671E−08 | −1.75197E−09 | 4.12176E−11 |
| S14 | 1.00000 | 7.63256E−07 | −2.52707E−10 | 5.17586E−14 | −4.53900E−18 |
| S15 | −3.82885 | −6.52773E−08 | 6.18184E−12 | −3.45459E−16 | 8.19157E−21 |

TABLE 4

Example 1 $: Extended Aspherical Surface Data of Surface S12, Bjk

| | j = 0 | j = 1 | j = 2 | j = 3 | j = 4 |
|---|---|---|---|---|---|
| k = 0 | | | −2.35851E−03 | 1.27100E−04 | −2.72877E−06 |
| k = 2 | −1.79790E−03 | 1.19508E−04 | −3.37474E−06 | −2.33214E−07 | 8.31897E−08 |
| k = 4 | 9.81717E−07 | −3.84550E−07 | 4.76439E−08 | −7.99335E−10 | −3.51742E−10 |
| k = 6 | 8.76255E−10 | 1.27341E−09 | −1.50766E−10 | 4.61476E−12 | 2.10022E−14 |
| k = 8 | −8.16995E−12 | −1.89706E−12 | 2.00988E−13 | | |
| k = 10 | 2.68021E−14 | | | | |

| | j = 5 | j = 6 | j = 7 | j = 8 | j = 9 | j = 10 |
|---|---|---|---|---|---|---|
| k = 0 | 2.05042E−07 | −1.41376E−09 | −7.38327E−10 | −2.69549E−11 | 3.96159E−12 | −7.28374E−14 |
| k = 2 | −5.87626E−09 | −1.55695E−10 | 2.66790E−11 | −5.98374E−13 | | |
| k = 4 | 3.20065E−11 | −7.51777E−13 | | | | |

TABLE 5

Example 2 Construction Data (1 of 2)

| Surface | CR[mm] | T[mm] | Nd | vd | Aperture Radius |
|---|---|---|---|---|---|
| SO | ∞ | 0.5 | 1.000000 | | |
| S1 | ∞ | 3.000 | 1.508470 | 61.1900 | (GP) |
| S2 | ∞ | | 1.000000 | | |
| S3* | 189.997 | 1.816 | 1.696800 | 55.8412 | |
| S4 | 241.982(ST) | 2.334 | 1.000000 | | 5.04 |
| S5 | −38.605 | 2.700 | 1.747503 | 27.8311 | |
| S6 | 22.305 | 4.492 | 1.646377 | 58.0262 | |
| S7 | −20.785 | 12.451 | 1.000000 | | |
| S8 | −74.861 | 5.341 | 1.781361 | 40.8938 | |
| S9 | −23.161 | 31.731 | 1.000000 | | |
| S10 | −20.196 | 2.000 | 1.613517 | 40.7162 | |
| S11 | −131.434 | 18.927 | 1.000000 | | |
| S12$ | −35.437 | 2.500 | 1.491400 | 57.8200 | (AL) |
| S13 | −35.437 | | 1.000000 | | |
| S14* | −294.607(M1) | | 1.000000 | | |
| S15* | 47.070(M2) | | 1.000000 | | |
| S16 | ∞(M3) | | 1.000000 | | |
| SI | ∞ | | | | |

TABLE 6

Example 2 Construction Data (2 of 2)

| Surface | Position, Vector | X | Y | Z |
|---|---|---|---|---|
| SO | o | 0 | 0 | 0 |
| | vx | 1 | 0 | 0 |
| | vy | 0 | 1 | 0 |
| | vz | 0 | 0 | 1 |
| S3 | o | 34.000 | 7.345 | 0.000 |
| | vx | 0.9996 | 0.0294 | 0.0000 |
| | vy | −0.0294 | 0.9996 | 0.0000 |
| | vz | 0.0000 | 0.0000 | 1.0000 |
| S14 (M1) | o | 141.898 | 5.381 | 0.000 |
| | vx | 0.9434 | −0.3316 | 0.0000 |
| | vy | 0.3316 | 0.9434 | 0.0000 |
| | vz | 0.0000 | 0.0000 | 1.0000 |
| S15 (M2) | o | 50.7765 | 80.3485 | 0.0000 |
| | vx | −0.8064 | 0.5914 | 0.0000 |
| | vy | 0.5914 | 0.8064 | 0.0000 |
| | vz | 0.000 | 0.000 | −1.000 |
| S16 (M3) | o | 190.094 | −37.377 | 0.000 |
| | vx | 0.8280 | −0.5607 | 0.0000 |
| | vy | 0.5607 | 0.8280 | 0.0000 |
| | vz | 0.0000 | 0.0000 | 1.0000 |
| SI | o | 372.265 | 649.672 | 0.000 |
| | vx | −0.8280 | 0.5607 | 0.0000 |
| | vy | −0.5607 | −0.8280 | 0.0000 |
| | vz | 0.0000 | 0.0000 | 1.0000 |

TABLE 7

Example 2 *: Rotation-Symmetric Aspherical Surface Data, Ai

| Surface | ε | A4 | A6 | A8 | A10 |
|---|---|---|---|---|---|
| S3 | 1.0 | −5.26838E−05 | 4.17086E−08 | −5.44173E−09 | 7.93752E−11 |
| S14 | 1.00000 | 6.62358E−07 | −2.27610E−10 | 4.68023E−14 | −4.02147E−18 |
| S15 | −3.31472 | −4.91541E−08 | 4.03043E−12 | −1.97713E−16 | 4.05533E−21 |

TABLE 8

Example 2 $: Extended Aspherical Surface Data of Surface S12, Bjk

| | j = 0 | j = 1 | j = 2 | j = 3 | j = 4 |
|---|---|---|---|---|---|
| k = 0 | | | −1.54043E−03 | 6.71668E−05 | −1.14495E−06 |
| k = 2 | −1.08803E−03 | 7.79593E−05 | −2.63705E−06 | −6.01460E−08 | 3.85518E−08 |
| k = 4 | 6.40984E−07 | −3.16444E−07 | 2.81334E−08 | −5.89432E−10 | −1.09449E−10 |
| k = 6 | 5.63791E−10 | 1.20440E−09 | −1.07116E−10 | 1.01204E−12 | 7.01249E−14 |
| k = 8 | −1.44503E−11 | −1.95489E−12 | 1.53591E−13 | | |
| k = 10 | 3.07566E−14 | | | | |

| | j = 5 | j = 6 | j = 7 | j = 8 | j = 9 | j = 10 |
|---|---|---|---|---|---|---|
| k = 0 | 1.50042E−07 | −6.91221E−09 | 5.88395E−11 | −2.82922E−11 | 1.70430E−12 | −2.34651E−14 |
| k = 2 | −2.74856E−09 | −8.51442E−11 | 1.09228E−11 | −2.13419E−13 | | |
| k = 4 | 7.96673E−12 | −1.43408E−13 | | | | |

TABLE 9

Example 3 Construction Data (1 of 2)

| Surface | CR[mm] | T[mm] | Nd | vd | Aperture Radius |
|---|---|---|---|---|---|
| SO | ∞ | 0.5 | 1.000000 | | |
| S1 | ∞ | 3.000 | 1.508470 | 61.1900 | (GP) |
| S2 | ∞ | | 1.000000 | | |
| S3* | 167.967 | 2.000 | 1.696800 | 55.8412 | |
| S4 | 311.405(ST) | 2.718 | 1.000000 | | 5.05 |
| S5 | −39.161 | 2.003 | 1.749005 | 27.7713 | |
| S6 | 21.644 | 3.789 | 1.661748 | 57.3065 | |
| S7 | −21.496 | 13.144 | 1.000000 | | |
| S8 | −74.092 | 5.315 | 1.755993 | 37.7879 | |
| S9 | −23.052 | 32.531 | 1.000000 | | |
| S10 | −20.283 | 2.000 | 1.596801 | 38.1751 | |
| S11 | −109.278 | 15.473 | 1.000000 | | |
| S12$ | −34.634 | 2.500 | 1.491400 | 57.8200 | (AL) |
| S13 | −34.634 | | 1.000000 | | |
| S14* | −355.681(M1) | | 1.000000 | | |
| S15* | 49.403(M2) | | 1.000000 | | |
| S16 | ∞(M3) | | 1.000000 | | |
| SI | ∞ | | | | |

TABLE 10

Example 3 Construction Data (2 of 2)

| Surface | Position, Vector | X | Y | Z |
|---|---|---|---|---|
| SO | o | 0 | 0 | 0 |
| | vx | 1 | 0 | 0 |
| | vy | 0 | 1 | 0 |
| | vz | 0 | 0 | 1 |
| S3 | o | 34.000 | 7.381 | 0.000 |
| | vx | 0.9993 | 0.0368 | 0.0000 |
| | vy | −0.0368 | 0.9993 | 0.0000 |
| | vz | 0.0000 | 0.0000 | 1.0000 |
| S14 (M1) | o | 137.949 | 5.757 | 0.000 |
| | vx | 0.9430 | −0.3329 | 0.0000 |
| | vy | 0.3329 | 0.9430 | 0.0000 |
| | vz | 0.0000 | 0.0000 | 1.0000 |
| S15 (M2) | o | 19.4935 | 105.3206 | 0.0000 |
| | vx | −0.7931 | 0.6091 | 0.0000 |
| | vy | 0.6091 | 0.7931 | 0.0000 |
| | vz | 0.000 | 0.000 | −1.000 |
| S16 (M3) | o | 187.956 | −75.929 | 0.000 |
| | vx | 0.8090 | −0.5879 | 0.0000 |
| | vy | 0.5879 | 0.8090 | 0.0000 |
| | vz | 0.0000 | 0.0000 | 1.0000 |
| SI | o | 535.564 | 925.457 | 0.000 |
| | vx | −0.8090 | 0.5879 | 0.0000 |
| | vy | −0.5879 | −0.8090 | 0.0000 |
| | vz | 0.0000 | 0.0000 | 1.0000 |

TABLE 11

Example 3 *: Rotation-Symmetric Aspherical Surface Data, Ai

| Surface | ϵ | A4 | A6 | A8 | A10 |
|---|---|---|---|---|---|
| S3 | 1.0 | −4.54343E−05 | 3.08026E−08 | −4.68937E−09 | 7.60533E−11 |
| S14 | 1.00000 | 5.88066E−07 | −2.11513E−10 | 4.52396E−14 | −4.06313E−18 |
| S15 | −3.10779 | −3.01682E−08 | 1.67235E−12 | −5.44263E−17 | 7.43497E−22 |

TABLE 12

Example 3 $: Extended Aspherical Surface Data of Surface S12, Bjk

| | j = 0 | j = 1 | j = 2 | j = 3 | j = 4 |
|---|---|---|---|---|---|
| k = 0 | | | −1.38828E−03 | 5.95471E−05 | −4.35737E−07 |
| k = 2 | −1.03090E−03 | 7.24510E−05 | −2.78947E−06 | 8.61837E−09 | 2.41799E−08 |
| k = 4 | 2.07216E−07 | −3.06206E−07 | 3.22317E−08 | −8.15263E−10 | −1.20701E−10 |
| k = 6 | 1.91734E−09 | 1.29050E−09 | −1.31931E−10 | 1.75105E−12 | 8.08320E−14 |
| k = 8 | −1.91967E−11 | −2.26550E−12 | 1.93683E−13 | | |
| k = 10 | 4.00783E−14 | | | | |

| | j = 5 | j = 6 | j = 7 | j = 8 | j = 9 | j = 10 |
|---|---|---|---|---|---|---|
| k = 0 | 1.04431E−07 | −5.99687E−09 | −2.97737E−11 | −2.64735E−11 | 1.97008E−12 | −3.12705E−14 |
| k = 2 | −2.06422E−09 | −8.02551E−11 | 1.02727E−11 | −2.07663E−13 | | |
| k = 4 | 9.33433E−12 | −1.77164E−13 | | | | |

TABLE 13

Example 4 Construction Data (1 of 2)

| Surface | CR[mm] | T[mm] | Nd | vd | Aperture Radius |
|---|---|---|---|---|---|
| SO | ∞ | 0.5 | 1.000000 | | |
| S1 | ∞ | 3.000 | 1.508470 | 61.1900 | (GP) |
| S2 | ∞ | | 1.000000 | | |
| S3* | 183.798 | 1.634 | 1.696800 | 55.8412 | |
| S4 | ∞(ST) | 2.396 | 1.000000 | | 5.16 |
| S5 | −37.657 | 1.532 | 1.723837 | 28.8430 | |
| S6 | 19.858 | 4.632 | 1.628488 | 58.9334 | |
| S7 | −20.822 | 12.341 | 1.000000 | | |
| S8 | −89.448 | 5.313 | 1.748450 | 43.8968 | |
| S9 | −22.838 | 32.274 | 1.000000 | | |
| S10 | −18.413 | 2.000 | 1.592007 | 46.8029 | |
| S11 | −251.701 | 22.283 | 1.000000 | | |
| S12$ | −35.699 | 2.500 | 1.491400 | 57.8200 | (AL) |
| S13 | −35.699 | | 1.000000 | | |
| S14* | −241.953(M1) | | 1.000000 | | |
| S15* | 36.985(M2) | | 1.000000 | | |
| S16 | ∞(M3) | | 1.000000 | | |
| SI | ∞ | | | | |

TABLE 14

Example 4 Construction Data (2 of 2)

| Surface | Position, Vector | X | Y | Z |
|---|---|---|---|---|
| SO | o | 0 | 0 | 0 |
| | vx | 1 | 0 | 0 |
| | vy | 0 | 1 | 0 |
| | vz | 0 | 0 | 1 |
| S3 | o | 34.000 | 6.961 | 0.000 |
| | vx | 0.9985 | 0.0555 | 0.0000 |
| | vy | −0.0555 | 0.9985 | 0.0000 |
| | vz | 0.0000 | 0.0000 | 1.0000 |
| S14 (M1) | o | 142.299 | 5.075 | 0.000 |
| | vx | 0.9379 | −0.3469 | 0.0000 |
| | vy | 0.3469 | 0.9379 | 0.0000 |
| | vz | 0.0000 | 0.0000 | 1.0000 |
| S15 (M2) | o | 60.206 | 81.267 | 0.000 |
| | vx | −0.7788 | 0.6272 | 0.0000 |
| | vy | 0.6272 | 0.7788 | 0.0000 |
| | vz | 0.0000 | 0.0000 | −1.0000 |
| S16 (M3) | o | 111.138 | −46.516 | 0.00 |
| | vx | 0.8012 | −0.5984 | 0.0000 |
| | vy | 0.5984 | 0.8012 | 0.0000 |
| | vz | 0.0000 | 0.0000 | 1.0000 |
| SI | o | 300.059 | 473.858 | 0.000 |
| | vx | −0.8012 | 0.5984 | 0.0000 |
| | vy | −0.5984 | −0.8012 | 0.0000 |
| | vz | 0.0000 | 0.0000 | 1.0000 |

TABLE 15

Example 4 *: Rotation-Symmetric Aspherical Surface Data, Ai

| Surface | ϵ | A4 | A6 | A8 | A10 |
|---|---|---|---|---|---|
| S3 | 1.0 | −4.86250E−05 | −1.17298E−08 | −3.04573E−09 | 4.83866E−11 |
| S14 | 1.00000 | 7.40345E−07 | −2.49493E−10 | 5.33439E−14 | −4.96732E−18 |
| S15 | −2.92420 | −6.68039E−08 | 6.16254E−12 | −3.63401E−16 | 9.72007E−21 |

TABLE 16

Example 4 $: Extended Aspherical Surface Data of Surface S12, Bjk

|  | j = 0 | j = 1 | j = 2 | j = 3 | j = 4 |
|---|---|---|---|---|---|
| k = 0 |  |  | −1.86149E−03 | 1.44799E−04 | −3.81065E−06 |
| k = 2 | −1.55333E−03 | 1.45152E−04 | −5.15858E−06 | −3.77210E−07 | 8.79168E−08 |
| k = 4 | 6.04659E−07 | −4.60685E−07 | 4.82560E−08 | −7.58240E−10 | −3.61671E−10 |
| k = 6 | −1.58357E−09 | 1.63309E−09 | −1.72763E−10 | 6.52178E−12 | −8.25782E−14 |
| k = 8 | −8.67146E−12 | −2.52569E−12 | 1.70415E−13 |  |  |
| k = 10 | 3.14683E−14 |  |  |  |  |

|  | j = 5 | j = 6 | j = 7 | j = 8 | j = 9 | j = 10 |
|---|---|---|---|---|---|---|
| k = 0 | 1.35699E−07 | 4.15820E−10 | −6.25868E−10 | −2.70124E−11 | 3.73132E−12 | −7.87175E−14 |
| k = 2 | −5.55313E−09 | −1.66112E−10 | 2.50047E−11 | −5.70078E−13 |  |  |
| k = 4 | 3.21513E−11 | −7.96913E−13 |  |  |  |  |

TABLE 17

Image Size (mm) on Primary Image Surface

|  | βy | βz | Y-Direction (Shorter-Side Direction) | Z-Direction (Longer-Side Direction) |
|---|---|---|---|---|
| Example 1 | 50.6 | 50.7 | −4.9248~4.9248 | −8.7552~8.7552 |
| Example 2 | 94.0 | 94.0 | −5.2531~5.2531 | −7.0042~7.0042 |
| Example 3 | 145.1 | 145.1 |  |  |
| Example 4 | 83.6 | 83.9 | −4.104~4.104 | −5.472~5.472 |

TABLE 18

| Ex. | RV (mm) | V1(mm) | T(mm) | V2(mm) | RV/V1 | T/V2 | (1), (1a): (RV/V1) × (T/V2) |
|---|---|---|---|---|---|---|---|
| 1 | 66.5 | 4.9248 | 149.99 | 498.06 | 13.50 | 0.30 | 4.05 |
| 2 | 81.4 | 5.2312 | 234.36 | 987.91 | 15.56 | 0.24 | 3.73 |
| 3 | 98.2 | 5.2312 | 307.25 | 1517.65 | 18.78 | 0.20 | 3.76 |
| 4 | 66.2 | 4.104 | 160.01 | 685.80 | 16.13 | 0.23 | 3.71 |

TABLE 19

Y & Z Coordinate Correspondence at ▲ & ● (FIGS. 13 to 16)

|  |  | Z(mm) |  |  |  |
|---|---|---|---|---|---|
| Y(mm) |  | Ex. 1 | Ex. 2 | Ex. 3 | Ex. 4 |
| Max. |  | 0.0 | 0.0 | 0.0 | 0.0 |
| ... |  | 0.6 | 0.5 | 0.5 | 0.4 |
| ... |  | 1.2 | 1.0 | 1.0 | 0.8 |
| ... |  | 1.9 | 1.5 | 1.5 | 1.2 |
| ... |  | 2.5 | 2.0 | 2.0 | 1.6 |
| ... |  | 3.1 | 2.5 | 2.5 | 2.0 |
| ... |  | 3.8 | 3.0 | 3.0 | 2.3 |
| 0 |  | 4.4 | 3.5 | 3.5 | 2.7 |
| ... |  | 5.0 | 4.0 | 4.0 | 3.1 |
| ... |  | 5.6 | 4.5 | 4.5 | 3.5 |
| ... |  | 6.3 | 5.0 | 5.0 | 3.9 |
| ... |  | 6.9 | 5.5 | 5.5 | 4.3 |
| ... |  | 7.5 | 6.0 | 6.0 | 4.7 |
| ... |  | 8.1 | 6.5 | 6.5 | 5.1 |
| Min. |  | 8.8 | 7.0 | 7.0 | 5.5 |

TABLE 20

Second Derivative of Aspherical Surface S3, f'(Ay) (FIGS. 17 to 20)

| Ay | Example 1 (Rmax = 5.45) | Example 2 (Rmax = 5.24) | Example 3 (Rmax = 5.27) | Example 4 (Rmax = 5.01) |
|---|---|---|---|---|
| 0.1 | 1.95E−04 | 5.03E−04 | 5.69E−04 | 5.20E−04 |
| 0.2 | 3.71E−04 | 9.57E−04 | 1.08E−03 | 9.90E−04 |
| 0.3 | 5.26E−04 | 1.36E−03 | 1.54E−03 | 1.41E−03 |
| 0.4 | 6.59E−04 | 1.72E−03 | 1.95E−03 | 1.78E−03 |
| 0.5 | 7.69E−04 | 2.02E−03 | 2.29E−03 | 2.09E−03 |
| 0.6 | 8.56E−04 | 2.27E−03 | 2.58E−03 | 2.35E−03 |
| 0.7 | 9.16E−04 | 2.47E−03 | 2.81E−03 | 2.56E−03 |
| 0.8 | 9.51E−04 | 2.61E−03 | 2.98E−03 | 2.71E−03 |
| 0.9 | 9.57E−04Δ | 2.69E−03 | 3.08E−03 | 2.80E−03 |
| 1 | 9.34E−04 | 2.71E−03Δ | 3.13E−03Δ | 2.83E−03Δ |
| 1.1 | 8.81E−04 | 2.68E−03 | 3.11E−03 | 2.80E−03 |
| 1.2 | 7.97E−04 | 2.58E−03 | 3.02E−03 | 2.71E−03 |
| 1.3 | 6.80E−04 | 2.43E−03 | 2.87E−03 | 2.56E−03 |
| 1.4 | 5.29E−04 | 2.21E−03 | 2.65E−03 | 2.34E−03 |
| 1.5 | 3.42E−04 | 1.92E−03 | 2.36E−03 | 2.06E−03 |
| 1.6 | 1.19E−04 | 1.57E−03 | 2.01E−03 | 1.72E−03 |
| 1.7 | −1.41E−04 | 1.15E−03 | 1.58E−03 | 1.30E−03 |
| 1.8 | −4.41E−04 | 6.68E−04 | 1.09E−03 | 8.22E−04 |
| 1.9 | −7.81E−04 | 1.13E−04 | 5.15E−04 | 2.71E−04 |
| 2 | −1.16E−03 | −5.13E−04 | −1.28E−04 | −3.51E−04 |
| 2.1 | −1.59E−03 | −1.21E−03 | −8.47E−04 | −1.05E−03 |
| 2.2 | −2.06E−03 | −1.98E−03 | −1.64E−03 | −1.81E−03 |
| 2.3 | −2.57E−03 | −2.83E−03 | −2.51E−03 | −2.66E−03 |
| 2.4 | −3.13E−03 | −3.75E−03 | −3.46E−03 | −3.57E−03 |
| 2.5 | −3.75E−03 | −4.75E−03 | −4.49E−03 | −4.57E−03 |
| 2.6 | −4.41E−03 | −5.83E−03 | −5.60E−03 | −5.64E−03 |
| 2.7 | −5.12E−03 | −6.99E−03 | −6.80E−03 | −6.80E−03 |

TABLE 21

Second Derivative of Aspherical Surface S3, f'(Ay) (FIGS. 17 to 20)

| Ay | Example 1 (Rmax = 5.45) | Example 2 (Rmax = 5.24) | Example 3 (Rmax = 5.27) | Example 4 (Rmax = 5.01) |
|---|---|---|---|---|
| 2.8 | −5.88E−03 | −8.23E−03 | −8.07E−03 | −8.03E−03 |
| 2.9 | −6.70E−03 | −9.56E−03 | −9.43E−03 | −9.35E−03 |
| 3 | −7.58E−03 | −1.10E−02 | −1.09E−02 | −1.08E−02 |
| 3.1 | −8.51E−03 | −1.25E−02 | −1.24E−02 | −1.22E−02 |
| 3.2 | −9.50E−03 | −1.41E−02 | −1.40E−02 | −1.38E−02 |
| 3.3 | −1.06E−02 | −1.57E−02 | −1.57E−02 | −1.55E−02 |
| 3.4 | −1.17E−02 | −1.75E−02 | −1.76E−02 | −1.72E−02 |
| 3.5 | −1.28E−02 | −1.94E−02 | −1.94E−02 | −1.91E−02 |
| 3.6 | −1.41E−02 | −2.13E−02 | −2.14E−02 | −2.10E−02 |
| 3.7 | −1.54E−02 | −2.34E−02 | −2.35E−02 | −2.30E−02 |

TABLE 21-continued

Second Derivative of Aspherical Surface S3, f''(Ay)
(FIGS. 17 to 20)

| Ay | Example 1 (Rmax = 5.45) | Example 2 (Rmax = 5.24) | Example 3 (Rmax = 5.27) | Example 4 (Rmax = 5.01) |
|---|---|---|---|---|
| 3.8 | −1.68E−02 | −2.55E−02 | −2.57E−02 | −2.52E−02 |
| 3.9 | −1.82E−02 | −2.78E−02 | −2.80E−02 | −2.74E−02 |
| 4 | −1.97E−02 | −3.01E−02 | −3.04E−02 | −2.97E−02 |
| 4.1 | −2.13E−02 | −3.26E−02 | −3.29E−02 | −3.21E−02 |
| 4.2 | −2.30E−02 | −3.51E−02 | −3.54E−02 | −3.47E−02 |
| 4.3 | −2.47E−02 | −3.78E−02 | −3.81E−02 | −3.73E−02 |
| 4.4 | −2.66E−02 | −4.06E−02 | −4.09E−02 | −4.00E−02 |
| 4.5 | −2.85E−02 | −4.34E−02 | −4.38E−02 | −4.29E−02 |
| 4.6 | −3.04E−02 | −4.64E−02 | −4.68E−02 | −4.58E−02 |
| 4.7 | −3.25E−02 | −4.96E−02 | −5.00E−02 | −4.89E−02 |
| 4.8 | −3.46E−02 | −5.28E−02 | −5.32E−02 | −5.21E−02 |
| 4.9 | −3.69E−02 | −5.61E−02 | −5.65E−02 | −5.53E−02 |
| 5 | −3.92E−02 | −5.96E−02 | −6.00E−02 | −5.87E−02 |
| 5.1 | −4.16E−02 | −6.31E−02 | −6.35E−02 | −6.22E−02 |
| 5.2 | −4.41E−02 | −6.68E−02 | −6.72E−02 | −6.59E−02 |
| 5.3 | −4.66E−02 | −7.06E−02 | −7.09E−02 | −6.96E−02 |
| 5.4 | −4.93E−02 | −7.45E−02 | −7.48E−02 | −7.34E−02 |
| 5.5 | −5.20E−02 | −7.86E−02 | −7.88E−02 | −7.74E−02 |

TABLE 22

First Derivative of Aspherical Surface S3, f'(Ay)
(FIGS. 21 to 24)

| Ay | Example 1 (Rmax = 5.45) | Example 2 (Rmax = 5.24) | Example 3 (Rmax = 5.27) | Example 4 (Rmax = 5.01) |
|---|---|---|---|---|
| 0.1 | 1.021E−05 | 2.631E−05 | 2.976E−05 | 2.720E−05 |
| 0.2 | 4.077E−05 | 1.052E−04 | 1.190E−04 | 1.087E−04 |
| 0.3 | 9.152E−05 | 2.364E−04 | 2.675E−04 | 2.444E−04 |
| 0.4 | 1.621E−04 | 4.197E−04 | 4.751E−04 | 4.340E−04 |
| 0.5 | 2.522E−04 | 6.546E−04 | 7.414E−04 | 6.771E−04 |
| 0.6 | 3.612E−04 | 9.406E−04 | 1.066E−03 | 9.730E−04 |
| 0.7 | 4.884E−04 | 1.277E−03 | 1.448E−03 | 1.321E−03 |
| 0.8 | 6.332E−04 | 1.663E−03 | 1.887E−03 | 1.721E−03 |
| 0.9 | 7.944E−04 | 2.097E−03 | 2.381E−03 | 2.172E−03 |
| 1 | 9.712E−04 | 2.579E−03 | 2.931E−03 | 2.672E−03 |
| 1.1 | 1.162E−03 | 3.107E−03 | 3.535E−03 | 3.220E−03 |
| 1.2 | 1.367E−03 | 3.680E−03 | 4.192E−03 | 3.816E−03 |
| 1.3 | 1.583E−03 | 4.297E−03 | 4.901E−03 | 4.459E−03 |
| 1.4 | 1.809E−03 | 4.956E−03 | 5.660E−03 | 5.145E−03 |
| 1.5 | 2.044E−03 | 5.655E−03 | 6.468E−03 | 5.875E−03 |
| 1.6 | 2.285E−03 | 6.392E−03 | 7.323E−03 | 6.645E−03 |
| 1.7 | 2.532E−03 | 7.166E−03 | 8.224E−03 | 7.455E−03 |
| 1.8 | 2.781E−03 | 7.974E−03 | 9.169E−03 | 8.303E−03 |
| 1.9 | 3.031E−03 | 8.815E−03 | 1.016E−02 | 9.186E−03 |
| 2 | 3.280E−03 | 9.685E−03 | 1.118E−02 | 1.010E−02 |
| 2.1 | 3.524E−03 | 1.058E−02 | 1.225E−02 | 1.105E−02 |
| 2.2 | 3.762E−03 | 1.151E−02 | 1.334E−02 | 1.203E−02 |
| 2.3 | 3.990E−03 | 1.245E−02 | 1.448E−02 | 1.303E−02 |
| 2.4 | 4.207E−03 | 1.341E−02 | 1.564E−02 | 1.405E−02 |
| 2.5 | 4.408E−03 | 1.439E−02 | 1.683E−02 | 1.510E−02 |
| 2.6 | 4.592E−03 | 1.539E−02 | 1.805E−02 | 1.616E−02 |
| 2.7 | 4.753E−03 | 1.639E−02 | 1.929E−02 | 1.724E−02 |

TABLE 23

First Derivative of Aspherical Surface S3, f'(Ay)
(FIGS. 21 to 24)

| Ay | Example 1 (Rmax = 5.45) | Example 2 (Rmax = 5.24) | Example 3 (Rmax = 5.27) | Example 4 (Rmax = 5.01) |
|---|---|---|---|---|
| 2.8 | 4.890E−03 | 1.740E−02 | 2.055E−02 | 1.832E−02 |
| 2.9 | 4.999E−03 | 1.841E−02 | 2.182E−02 | 1.942E−02 |
| 3 | 5.076E−03 | 1.942E−02 | 2.311E−02 | 2.052E−02 |
| 3.1 | 5.116E−03 | 2.042E−02 | 2.441E−02 | 2.162E−02 |
| 3.2 | 5.117E−03Δ | 2.142E−02 | 2.571E−02 | 2.272E−02 |

TABLE 23-continued

First Derivative of Aspherical Surface S3, f'(Ay)
(FIGS. 21 to 24)

| Ay | Example 1 (Rmax = 5.45) | Example 2 (Rmax = 5.24) | Example 3 (Rmax = 5.27) | Example 4 (Rmax = 5.01) |
|---|---|---|---|---|
| 3.3 | 5.074E−03 | 2.240E−02 | 2.702E−02 | 2.381E−02 |
| 3.4 | 4.982E−03 | 2.337E−02 | 2.832E−02 | 2.489E−02 |
| 3.5 | 4.838E−03 | 2.431E−02 | 2.962E−02 | 2.595E−02 |
| 3.6 | 4.636E−03 | 2.523E−02 | 3.091E−02 | 2.700E−02 |
| 3.7 | 4.372E−03 | 2.611E−02 | 3.219E−02 | 2.802E−02 |
| 3.8 | 4.040E−03 | 2.696E−02 | 3.345E−02 | 2.901E−02 |
| 3.9 | 3.637E−03 | 2.776E−02 | 3.469E−02 | 2.997E−02 |
| 4 | 3.156E−03 | 2.852E−02 | 3.590E−02 | 3.089E−02 |
| 4.1 | 2.592E−03 | 2.923E−02 | 3.708E−02 | 3.176E−02 |
| 4.2 | 1.939E−03 | 2.987E−02 | 3.823E−02 | 3.259E−02 |
| 4.3 | 1.192E−03 | 3.045E−02 | 3.933E−02 | 3.336E−02 |
| 4.4 | 3.455E−04 | 3.096E−02 | 4.038E−02 | 3.407E−02 |
| 4.5 | −6.075E−04 | 3.140E−02 | 4.139E−02 | 3.471E−02 |
| 4.6 | −1.673E−03 | 3.175E−02 | 4.233E−02 | 3.528E−02 |
| 4.7 | −2.856E−03 | 3.200E−02 | 4.321E−02 | 3.578E−02 |
| 4.8 | −4.165E−03 | 3.217E−02 | 4.403E−02 | 3.619E−02 |
| 4.9 | −5.604E−03 | 3.223E−02Δ | 4.477E−02 | 3.651E−02 |
| 5 | −7.182E−03 | 3.218E−02 | 4.543E−02 | 3.673E−02 |
| 5.1 | −8.904E−03 | 3.201E−02 | 4.601E−02 | 3.685E−02 |
| 5.2 | −1.078E−02 | 3.171E−02 | 4.649E−02 | — |
| 5.3 | −1.281E−02 | 3.129E−02 | 4.688E−02 | — |
| 5.4 | −1.500E−02 | — | — | — |
| 5.5 | −1.737E−02 | — | — | — |

What is claimed is:

1. A projection optical system for performing enlargement projection from a primary image surface on a reduction side to a secondary image surface on a enlargement side, the projection optical system comprising, from a primary image surface side:

a lens optical system including two or more lens elements sharing a common rotation-symmetry axis and each having an optical power;

a first reflective optical element having an optical power; and a second reflective optical element having a negative optical power, wherein the projection optical system is non-telecentric toward the reduction side, and the following condition is fulfilled:

$$30° \leq \theta \leq 70°$$

where

θ represents an angle of incidence at which a central principal ray is incident on the secondary image surface.

2. The projection optical system of claim 1, wherein the first reflective optical element has a positive optical power.

3. The projection optical system of claim 2, wherein the first reflective optical element has a reflective surface having a rotation-symmetric shape.

4. The projection optical system of claim 3, wherein the reflective surface of the first reflective optical element is a rotation-symmetric aspherical surface.

5. The projection optical system of claim 3, wherein the first reflective optical element has an optical power eccentric with respect to a normal to the primary image surface.

6. The projection optical system of claim 5, wherein a rotation symmetry axis of the reflective surface of the first reflective optical element is located outside an area over which a projected light beam strikes the first reflective optical element.

7. The projection optical system of claim 1, wherein the second reflective optical element has a reflective surface having a rotation-symmetric shape.

8. The projection optical system of claim 7, wherein the reflective surface of the second reflective optical element is a rotation-symmetric aspherical surface.

9. The projection optical system of claim 7, wherein the second reflective optical element has an optical power eccentric with respect to a normal to the primary image surface.

10. The projection optical system of claim 9, wherein a rotation symmetry axis of the reflective surface of the second reflective optical element is located outside an area over which a projected light beam strikes the second reflective optical element.

11. The projection optical system of claim 1, wherein the lens optical system includes a non-rotation-symmetric lens element, the non-rotation-symmetric lens element having a non-rotation-symmetric surface that has at most one plane of symmetry.

12. The projection optical system of claim 1, wherein an optical axis of the lens optical system is inclined relative to a normal to the primary image surface.

13. The projection optical system of claim 1,
wherein a most primary-image-surface-side lens element along an optical path of the lens optical system has as an optical surface a rotation-symmetric aspherical surface, and
wherein, let a vertex of the aspherical surface be Ao, let a vector from the vertex Ao to a point at which a rotation-symmetry axis of the aspherical surface intersects another surface of the most primary-image-surface-side lens element be Avx, and let a vector perpendicular to the vector Avx be Avy, and moreover, in a two-dimensional coordinate system formed by the vectors Avx and Avy with an origin at the vertex Ao, let a value in a direction of the vector Avx be represented by Ax, let a value in a direction of the vector Avy be represented by Ay, and let a shape of the aspherical surface be defined as Ax=f(Ay), then a second derivative function f(Ay)" of f(Ay) has at least either a maximum or a minimum within a range fulfilling the following condition:

$$0 < Ay < Rmax$$

where
Rmax represents an effective optical path radius of the aspherical surface.

14. The projection optical system of claim 1, wherein the following condition is fulfilled:

$$0 < (RV/V1) \times (T/V2) < 5$$

where
RV represents a dimension of an effective optical path on the second reflective optical element as measured in a direction of shorter sides of the secondary image surface;
V1 represents a dimension of the primary image surface in a direction of shorter sides thereof;
T represents, in a case where the projection optical system is used in a rear-projection image display apparatus, a thickness of the apparatus in a direction of a normal to the secondary image surface; and
V2 represents a dimension of the secondary image surface in the direction of the shorter sides thereof.

15. The projection optical system of claim 1, further comprising:
an aperture stop,
wherein the lens optical system includes a positive lens element and a negative lens element, and
wherein the positive and negative lens elements are disposed near the aperture stop.

16. The projection optical system of claim 15, wherein the positive and negative lens elements are cemented together.

17. The projection optical system of claim 1, wherein a pupil of the projection optical system is located between the primary image surface and a most secondary-image-surface-side lens element of the lens optical system.

18. The projection optical system of claim 1, further comprising an aperture stop,
wherein the aperture stop is disposed near a most primary-image-surface-side lens element of the lens optical system.

19. The projection optical system of claim 1, wherein, with respect to an angle θ1 between a normal to the primary image surface and an optical axis of the lens optical system, the following condition is fulfilled:

$$0.5° \leq |θ1| \leq 10°.$$

20. The projection optical system of claim 1, wherein, with respect to an angle θ2 between a normal to the primary image surface and a normal to the secondary image surface, the following condition is fulfilled:

$$15° \leq |θ2| \leq 60°.$$

21. The projection optical system of claim 1, wherein all light rays from the primary image surface are obliquely incident on the secondary image surface.

22. A projection optical system for performing enlargement projection from a primary image surface on a reduction side to a secondary image surface on a enlargement side, the projection optical system comprising, from a primary image surface side:
a lens optical system including two or more lens elements sharing a common rotation-symmetry axis and each having an optical power;
a first reflective optical element having an optical power;
a second reflective optical element having a negative optical power, and
a flat reflection mirror disposed parallel to the secondary image surface so as to bend an optical path,
wherein the projection optical system is non-telecentric toward the reduction side, and the following condition is fulfilled:

$$30° \leq θ \leq 70°$$

where
θ represents an angle of incidence at which a central principal ray is incident on the secondary image surface.

* * * * *